US008935483B2

(12) United States Patent
Pirog

(10) Patent No.: US 8,935,483 B2
(45) Date of Patent: Jan. 13, 2015

(54) CONCURRENT, COHERENT CACHE ACCESS FOR MULTIPLE THREADS IN A MULTI-CORE, MULTI-THREAD NETWORK PROCESSOR

(75) Inventor: Jerry Pirog, Easton, PA (US)

(73) Assignee: LSI Corporation, Milpitas, CA (US)

( * ) Notice: Subject to any disclaimer, the term of this patent is extended or adjusted under 35 U.S.C. 154(b) by 912 days.

(21) Appl. No.: 12/976,228

(22) Filed: Dec. 22, 2010

(65) Prior Publication Data

US 2011/0225372 A1 Sep. 15, 2011

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/313,399, filed on Mar. 12, 2010, provisional application No. 61/313,219, filed on Mar. 12, 2010.

(51) Int. Cl.

| | |
|---|---|
| ***G06F 12/00*** | (2006.01) |
| ***G06F 9/38*** | (2006.01) |
| ***G06F 9/46*** | (2006.01) |
| ***G06F 12/08*** | (2006.01) |
| ***G06F 15/167*** | (2006.01) |
| ***H04L 12/54*** | (2013.01) |
| ***H04L 12/853*** | (2013.01) |
| ***H04L 12/851*** | (2013.01) |

(52) U.S. Cl.

CPC ............ *G06F 9/3885* (2013.01); *G06F 9/3851* (2013.01); *G06F 9/46* (2013.01); *G06F 12/0842* (2013.01); *G06F 12/0844* (2013.01); *G06F 15/167* (2013.01); *H04L 12/56* (2013.01); *H04L 47/2416* (2013.01); *H04L 47/2441* (2013.01); *G06F 12/0815* (2013.01)

USPC .......................................... 711/141; 711/168

(58) Field of Classification Search

USPC .................................................. 711/141, 168

See application file for complete search history.

(56) References Cited

U.S. PATENT DOCUMENTS 4,622,631 A 11/1986 Frank et al.
5,623,698 A 4/1997 Stephenson et al.

(Continued)

FOREIGN PATENT DOCUMENTS

JP H02-271444 11/1990
WO 2004/045167 5/2004

OTHER PUBLICATIONS

Ruay-Shiung Chang, Hui-Ping Chang, Yun-Ting Wang; A Dynamic Weighted Data Replication Strategy in Data Grids; 2008; IEEE; USA.

(Continued)

*Primary Examiner* — Gurtej Bansal

(74) *Attorney, Agent, or Firm* — Daniel J. Santos; Smith Risley Tempel Santos LLC

(57) ABSTRACT

Described embodiments provide a packet classifier of a network processor having a plurality of processing modules. A scheduler generates a thread of contexts for each tasks generated by the network processor corresponding to each received packet. The thread corresponds to an order of instructions applied to the corresponding packet. A multi-thread instruction engine processes the threads of instructions. A state engine operates on instructions received from the multi-thread instruction engine, the instruction including a cache access request to a local cache of the state engine. A cache line entry manager of the state engine translates between a logical index value of data corresponding to the cache access request and a physical address of data stored in the local cache. The cache line entry manager manages data coherency of the local cache and allows one or more concurrent cache access requests to a given cache data line for non-overlapping data units.

11 Claims, 16 Drawing Sheets

(56) References Cited

U.S. PATENT DOCUMENTS

| | | | |
|---|---|---|---|
| 5,632,032 | A | 5/1997 | Ault et al. |
| 5,892,766 | A | 4/1999 | Wicki et al. |
| 5,943,283 | A | 8/1999 | Wong et al. |
| 6,038,630 | A | 3/2000 | Foster et al. |
| 6,105,118 | A | 8/2000 | Maddalozzo, Jr. et al. |
| 6,195,335 | B1 | 2/2001 | Calvignac et al. |
| 6,567,564 | B1 | 5/2003 | van der Wal |
| 6,636,932 | B1 | 10/2003 | Regev et al. |
| 6,914,746 | B1 | 7/2005 | Meyer |
| 7,089,346 | B2 | 8/2006 | Cebulla et al. |
| 7,234,018 | B1 | 6/2007 | Purcell et al. |
| 7,287,255 | B2 | 10/2007 | Potter, Jr. |
| 7,461,208 | B1 | 12/2008 | Caprioli et al. |
| 7,490,111 | B2 | 2/2009 | Shen et al. |
| 7,571,284 | B1 | 8/2009 | Olson et al. |
| 7,596,142 | B1 | 9/2009 | MacAdam |
| 7,689,867 | B2 | 3/2010 | Rosenbluth et al. |
| 2002/0029214 | A1 | 3/2002 | Yianilos et al. |
| 2002/0165985 | A1 | 11/2002 | Chen et al. |
| 2003/0033276 | A1 | 2/2003 | Cheng et al. |
| 2003/0115417 | A1 | 6/2003 | Corrigan |
| 2003/0123468 | A1 | 7/2003 | Nong |
| 2004/0255209 | A1 | 12/2004 | Gross |
| 2005/0027920 | A1 | 2/2005 | Fitzsimmons et al. |
| 2005/0152352 | A1 | 7/2005 | Jun et al. |
| 2005/0240820 | A1 | 10/2005 | Vannerson et al. |
| 2006/0256783 | A1 | 11/2006 | Ayrapetian et al. |
| 2007/0016756 | A1 | 1/2007 | Hsieh et al. |
| 2007/0226798 | A1 | 9/2007 | Sibert |
| 2008/0077926 | A1 | 3/2008 | Jeter et al. |
| 2008/0162605 | A1 | 7/2008 | Tsuchiya |
| 2008/0162793 | A1 | 7/2008 | Chu et al. |
| 2010/0260198 | A1 | 10/2010 | Rojas-Cessa et al. |

OTHER PUBLICATIONS

Deng Pan & Yuanyuan Yang; FIFP-based multicast scheduling algorithm for virtual output queued packet switches; Oct. 2005; IEEE; USA.

Cyriel Minkenberg; Integrating unicast and multicast traffic scheduling in a combined input-and output-queued packet switching system; Oct. 2000; IBM; USA.

*FIG. 4*

| | VALID | IBASE[3:0] | IEND[3:0] | SBASE[3:0] | DF |
|---|---|---|---|---|---|
| TABLE[0] | 1 | 0 | 15 | 0 | 0 |
| TABLE[1] | 0 | N/A | N/A | N/A | N/A |

| BANK 0 | | |
|---|---|---|
| STRUCTURE ADDRESS | REQUEST ADDRESS | CONTENTS |
| 0 | 0 | DATA 0 |
| 2 | 2 | DATA 2 |
| 4 | 4 | DATA 4 |
| 6 | 6 | DATA 6 |
| 8 | 8 | DATA 8 |
| 10 | 10 | DATA 10 |
| 12 | 12 | DATA 12 |
| 14 | 14 | DATA 14 |

| BANK 1 | | |
|---|---|---|
| STRUCTURE ADDRESS | REQUEST ADDRESS | CONTENTS |
| 1 | 1 | DATA 1 |
| 3 | 3 | DATA 3 |
| 5 | 5 | DATA 5 |
| 7 | 7 | DATA 7 |
| 9 | 9 | DATA 9 |
| 11 | 11 | DATA 11 |
| 13 | 13 | DATA 13 |
| 15 | 15 | DATA 15 |

*FIG. 5*

| | VALID | IBASE[3:0] | IEND[3:0] | SBASE[3:0] | DF |
|---|---|---|---|---|---|
| TABLE[0] | 1 | 0 | 7 | 0 | 1 |
| TABLE[1] | 0 | N/A | N/A | N/A | N/A |

| BANK 0 | | |
|---|---|---|
| STRUCTURE ADDRESS | REQUEST ADDRESS | CONTENTS |
| 0 | 0 | DATA 0 |
| 2 | 1 | DATA 1 |
| 4 | 2 | DATA 2 |
| 6 | 3 | DATA 3 |
| 8 | 4 | DATA 4 |
| 10 | 5 | DATA 5 |
| 12 | 6 | DATA 6 |
| 14 | 7 | DATA 7 |

| BANK 1 | | |
|---|---|---|
| STRUCTURE ADDRESS | REQUEST ADDRESS | CONTENTS |
| 1 | 0 | DATA 0 |
| 3 | 1 | DATA 1 |
| 5 | 2 | DATA 2 |
| 7 | 3 | DATA 3 |
| 9 | 4 | DATA 4 |
| 11 | 5 | DATA 5 |
| 13 | 6 | DATA 6 |
| 15 | 7 | DATA 7 |

FIG. 6

| | VALID | IBASE[3:0] | IEND[3:0] | SBASE[3:0] | DF |
|---|---|---|---|---|---|
| TABLE[0] | 1 | 0 | 7 | 0 | 0 |
| TABLE[1] | 1 | 8 | 11 | 4 | 1 |

| BANK 0 | | |
|---|---|---|
| STRUCTURE ADDRESS | REQUEST ADDRESS | CONTENTS |
| 0 | 0 | DATA 0 |
| 2 | 2 | DATA 2 |
| 4 | 4 | DATA 4 |
| 6 | 6 | DATA 6 |
| 8 | 8 | DATA 8 |
| 10 | 9 | DATA 9 |
| 12 | 10 | DATA 10 |
| 14 | 11 | DATA 11 |

| BANK 1 | | |
|---|---|---|
| STRUCTURE ADDRESS | REQUEST ADDRESS | CONTENTS |
| 1 | 1 | DATA 1 |
| 3 | 3 | DATA 3 |
| 5 | 5 | DATA 5 |
| 7 | 7 | DATA 7 |
| 9 | 8 | DATA 8 |
| 11 | 9 | DATA 9 |
| 13 | 10 | DATA 10 |
| 15 | 11 | DATA 11 |

MOVING NON-EMPTY THREAD TO NON-EMPTY OQ

MOVING NON-EMPTY THREAD TO EMPTY OQ

MOVING NON-EMPTY THREAD TO NON-EMPTY OQ

MOVING NON-EMPTY THREAD TO EMPTY OQ

1704

| DATA UNIT | 0 | 1 | 2 | 3 | 4 | 5 | ... | M |
|---|---|---|---|---|---|---|---|---|
| CACHE LINE ENTRY 0 | | | IN USE | IN USE | | | | |
| CACHE LINE ENTRY 1 | | | | | IN USE | IN USE | | |
| ... | | | | | | | | |
| CACHE LINE ENTRY N | | | | | | | | IN USE |

CONCURRENT, COHERENT CACHE ACCESS FOR MULTIPLE THREADS IN A MULTI-CORE, MULTI-THREAD NETWORK PROCESSOR

CROSS-REFERENCE TO RELATED APPLICATIONS

This application claims the benefit of the filing date of U.S. provisional application No. 61/313,399 filed Mar. 12, 2010 and U.S. provisional application No. 61/313,219 filed Mar. 12, 2010, the teachings of which are incorporated herein in their entireties by reference.

This application is a continuation-in-part, and claims the benefit of the filing date, of U.S. patent application Ser. No. 12/782,379 filed May 18, 2010, U.S. patent application Ser. No. 12/782,393 filed May 18, 2010 now U.S. Pat. No. 8,255,644, and U.S. patent application Ser. No. 12/782,411 filed May 18, 2010 now U.S. Pat. No. 8,407,707, the teachings of which are incorporated herein in their entireties by reference.

The subject matter of this application is related to U.S. patent application Ser. No. 12/430,438 filed Apr. 27, 2009, U.S. patent application Ser. No. 12/729,226 filed Mar. 22, 2010, U.S. patent application Ser. No. 12/729,231 filed Mar. 22, 2010, U.S. patent application Ser. No. 12/963,895 filed Dec. 9, 2010, U.S. patent application Ser. No. 12/971,742 filed Dec. 17, 2010, U.S. patent application Ser. No. 12/974,477 filed Dec. 21, 2010, U.S. patent application Ser. No. 12/975,823 filed Dec. 22, 2010, U.S. patent application Ser. No. 12/975,880 filed Dec. 22, 2010 , and U.S. patent application Ser. No. 12/976,228 filed Dec. 22, 2010, the teachings of which are incorporated herein in their entireties by reference.

BACKGROUND OF THE INVENTION

1. Field of the Invention

The present invention relates to communication systems, in particular, to an accelerated processor architecture for network communications.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by the using accelerators.

Read latency and overall read throughput to storage devices with sequential access penalties, particularly memories external to a system on chip (SoC), can be performance bottlenecks for the SoC. For example, an external memory might include two or more substructures (e.g., multiple banks of DRAM). In such a system, a latency penalty might be incurred for sequential read requests to the same memory substructure. Several mechanisms have been developed for addressing this bottleneck. One mechanism queues read operations or requests ("read requests") destined for each individual memory substructure and then selects read requests for non-busy substructures from one or more queues. Queuing works well when these read requests are spread evenly among the memory substructures, but fails if all the read requests target a particular substructure. Another mechanism duplicates the entire data structure multiple times with a number of copies and then selects a non-busy substructure as the target of the read request. This mechanism works well and overcomes some of the shortcomings of the other mechanism, but the amount of data stored by the memory is reduced by i) the inverse of the number of copies regardless of whether or not all of the data benefited from the duplication, or ii) the memory required increases as a multiple of the number of copies required.

In multi-threaded systems, multiple threads might have active functions to access data in one or more fragments of data in a single line entry of a data cache. It is desirable that these threads be able to access each fragment of data concurrently, so long as no two threads access the same fragment of data in the cache line entry. Typical approaches might ensure data coherency only on a cache line boundary, which might slow down function processing, due to head-of-line blocking for functions wanting to operate on non-overlapping fragments of data within the same cache line.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a packet classifier of a network processor having a plurality of processing modules. A scheduler generates a thread of contexts for each tasks generated by the network processor corresponding to each received packet. The thread corresponds to an order of instructions applied to the corresponding packet. A multi-thread instruction engine processes the threads of instructions. A state engine operates on instructions received from the multi-thread instruction engine, the instruction including a cache access request to a local cache of the state engine. A cache line entry manager of the state engine translates between a logical index value of data corresponding to the cache access request and a physical address of data stored in the local cache. The cache line entry manager manages data coherency of the local cache and allows one or more concurrent cache access requests to a given cache data line for non-overlapping data units.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4 shows a first exemplary tree memory addressing algorithm of the memory interface of FIG. 3;

FIG. 5 shows a second exemplary tree memory addressing algorithm of the memory interface of FIG. 3;

FIG. 6 shows a third exemplary tree memory addressing algorithm of the memory interface of FIG. 3;

DETAILED DESCRIPTION

Described embodiments of the present invention provide a packet classifier of a network processor having a plurality of processing modules. A scheduler generates a thread of contexts for each tasks generated by the network processor corresponding to each received packet. The thread corresponds to an order of instructions applied to the corresponding packet. A multi-thread instruction engine processes the threads of instructions. A state engine operates on instructions received from the multi-thread instruction engine, the instruction including a cache access request to a local cache of the state engine. A cache line entry manager of the state engine translates between a logical index value of data corresponding to the cache access request and a physical address of data stored in the local cache. The cache line entry manager manages data coherency of the local cache and allows one or more concurrent cache access requests to a given cache data line for non-overlapping data units.

Table 1 defines a list of acronyms employed throughout this specification as an aid to understanding the described embodiments of the present invention:

TABLE 1

| | | | |
|---|---|---|---|
| USB | Universal Serial Bus | FIFO | First-In, First-Out |
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SoC | System-on-Chip | μP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | THID | Thread Identifier |
| HE | Hash Engine | PQM | Pre-Queue Modifier |
| SENG | State Engine | FBI | Function Bus Interface |
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| SDWRR | Smooth Deficit Weighted Round-Robin | CRC | Cyclic Redundancy Check |
| IP | Internet Protocol | | |

Figure 1:
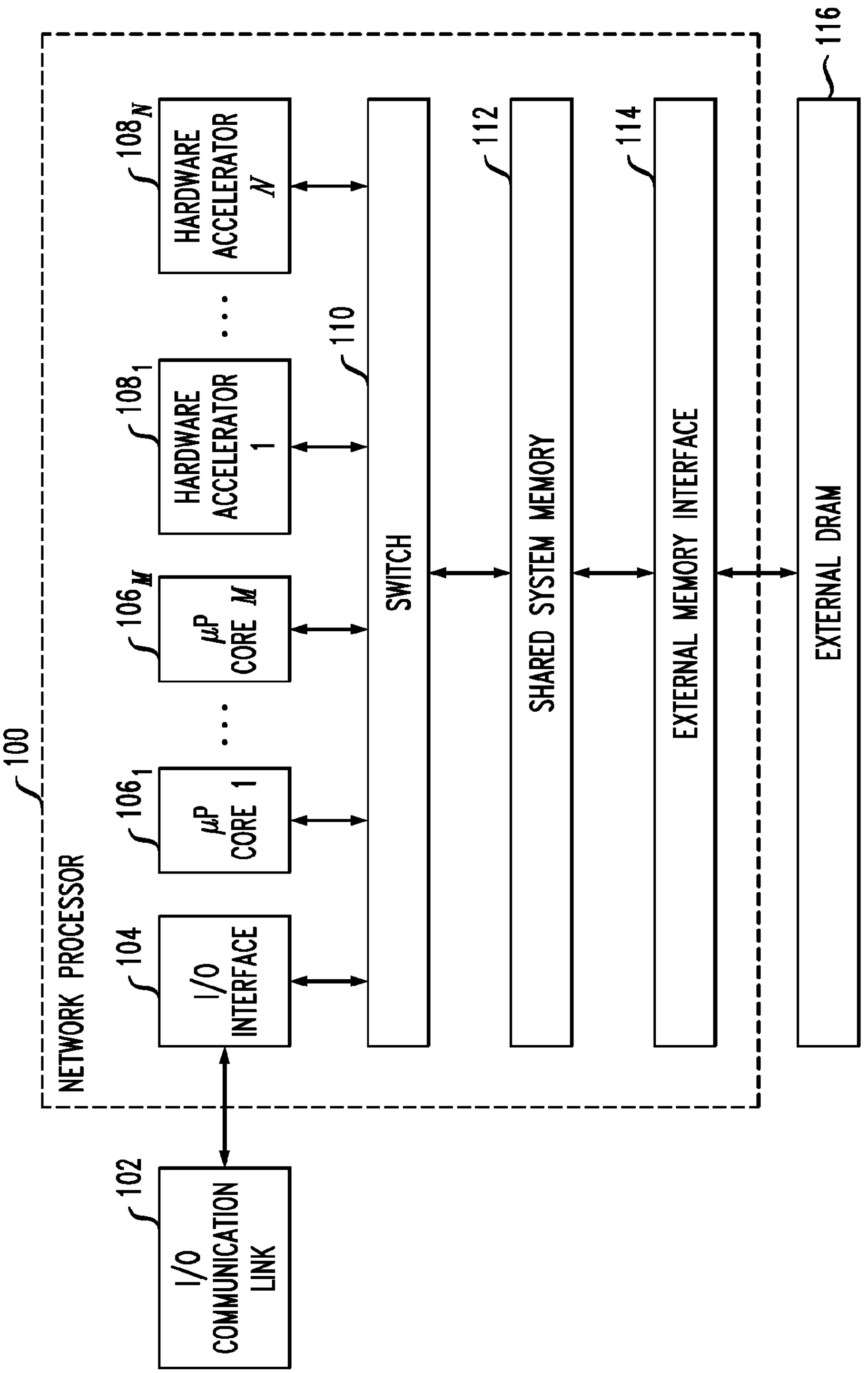
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled to switch 110 that is coupled to shared memory 112. Switch 110 might be implemented as a non-blocking crossbar switch such as described in related U.S. patent application Ser. No. 12/430, 438 filed Apr. 27, 2009, U.S. patent application Ser. No. 12/729,226 filed Mar. 22, 2010, and U.S. patent application Ser. No. 12/729,231 filed Mar. 22, 2010.

I/O interface 104 might typically be implemented as hardware that connects network processor 100 to one or more external devices through I/O communication link 102. I/O communication link 102 might generally be employed for communication with one or more external devices, such as a computer system or a networking device, that interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to external memory 116 to provide off-chip storage of data not needed by the various μP cores 106 and hardware accelerators 108 to free space in shared memory 112. The μP cores and hardware accelerators might interact with each other as described in related U.S. patent application Ser. Nos. 12/782,379, 12/782,393, and 12/782,411, all filed May 18, 2010, for example, by one or more communication bus rings that pass "tasks" from a source core to a destination core. As described herein, tasks are instructions to the destination core to perform certain functions, and a task might contain address pointers to data stored in shared memory 112.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably received for a task and transmitted externally. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 and hardware accelerators 108 might include, for example, a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling for up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down different virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED becomes the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,439,652 or U.S. Patent Application Publication No. 2008/0270342, both of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove the need for replicating the data each time the data is needed. The MMB preferably tracks the memory allocations using a stack-based approach since a memory block recently released is preferably the next block to be allocated for a particular task, reducing cache trashing and cache tracking overhead.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization.

The MPP is a multi-threaded special purpose processor that provides tree based longest prefix and access control list classification. The MPP also has a hardware hash-based classification capability with full hardware management of hash-table additions, deletions, and collision handling. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files.

Figure 2:
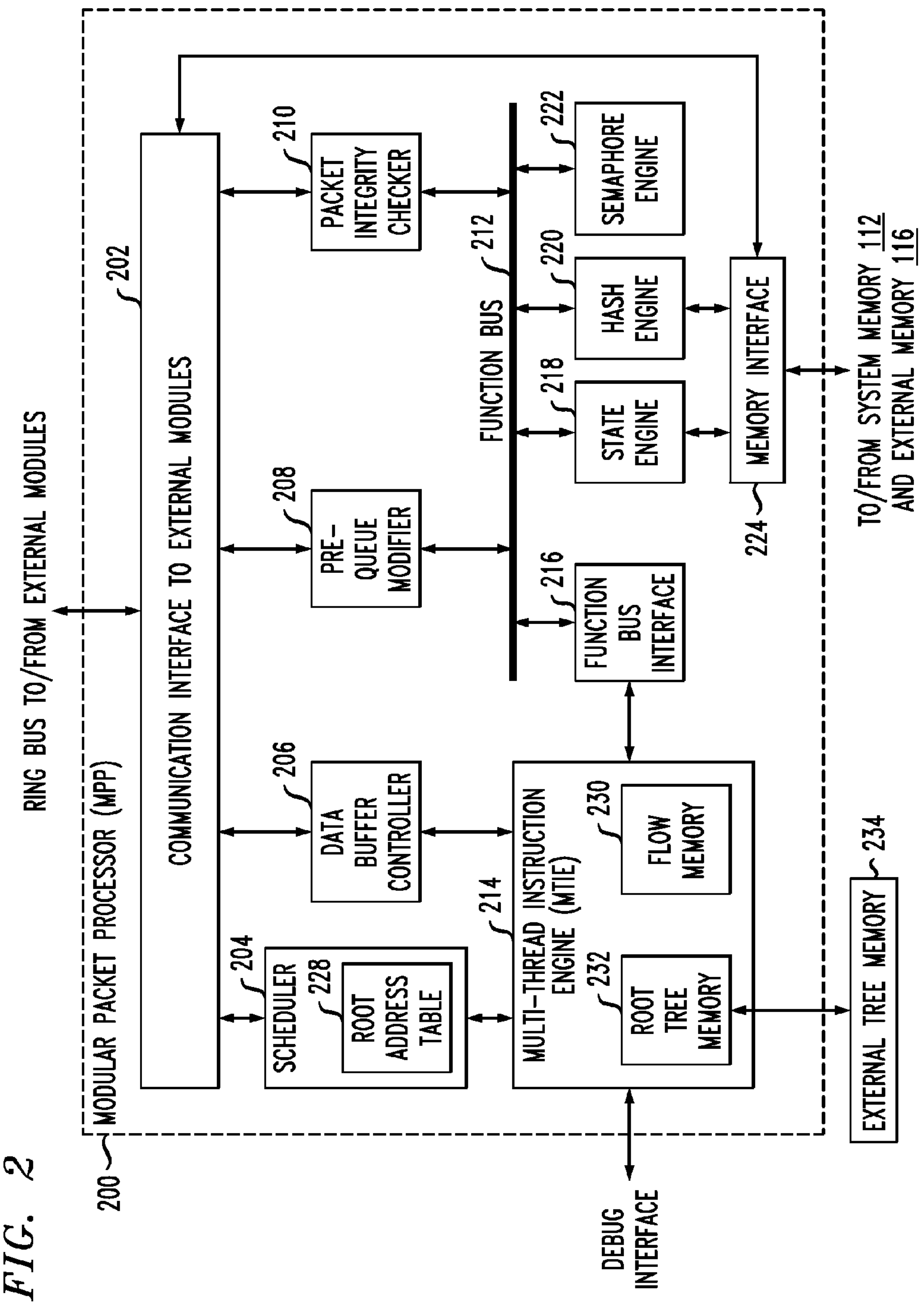
FIG. 2 shows a block diagram of a modular packet processor submodule of the network processor of FIG. 1.

FIG. 2 shows a block diagram of an exemplary MPP 200, in accordance with embodiments of the present invention. MPP 200 might receive an input task from any μP core or accelerator (e.g., μP cores 106 or accelerators 108) of network processor 100. MPP 200 performs operations specified by the input task on a data packet stored in at least one of shared memory 112 and external memory 116. When MPP 200 is finished operating on the data packet, MPP 200 might generate an output task to another μP core or accelerator of network processor 100, for example, a next μP core or accelerator specified for a given virtual flow identifier.

As described herein, MPP 200 might generally be employed as a packet classification engine in network processor 100. In general, packet classification categorizes packets into classes, for example, based on port number or protocol. Each resulting packet class might be treated differently to control packet flow, for example, each packet class might be subject to a different rate limit or prioritized differently relative to other packet classes. Classification is achieved by various means. Matching bit patterns of data to those of known protocols is a simple, yet widely-used technique. More advanced traffic classification techniques rely on statistical analysis of attributes such as byte frequencies, packet sizes and packet inter-arrival times. Upon classifying a traffic flow using a particular protocol, a predetermined policy can be applied to it and other flows to either guarantee a certain quality (as with VoIP or media streaming service) or to provide best-effort delivery.

As shown in FIG. 2, and as will be described, packet classification might be performed by Multi-thread Instruction Engine (MTIE) 214 of MPP 200. Packet (also Protocol Data Unit or PDU) data modification might be carried out by Pre-Queue Modifier (PQM) 208. A packet integrity check might typically be carried out by Packet Integrity Checker (PIC) 210, such as determining that a packet is properly formed according to a given protocol. PIC 210 might, for example, implement various CRC and checksum functions of MPP 200. Interface to communication interface 202 might provide a standard interface between MPP 200 and chip level connections to external modules of network processor 100, for example by one or more ring communication buses.

Semaphore Engine (SEM) 222 implements semaphore logic in MPP 200, and might support up to 1024 logical semaphores, which might correspond to 4 physical semaphores, each corresponding to 256 logical semaphores. Semaphores are used to manage atomic access to a hardware resource of network processor 100 and MPP 200. For example, for a context thread to utilize an instance of a hardware resource, the context thread might have to reserve a semaphore for that resource. A context might be allowed to have up to 4 outstanding physical semaphores. Semaphores are allocated and released by SEM 222 based on function calls received by function bus 212. SEM 222 might support ordered and unordered semaphore calls.

Hash table operations might be carried out by Hash Engine (HE) 220. HE 220 implements hash engine functionality in MPP 200. HE 220 receives instructions from Function Bus Interface (FBI) 216 over function bus 212. HE 220 executes the function calls in the order in which it receives them on the function bus, for example by employing order queues. HE 220 might include order logic to store function calls for up to 64 contexts. Hash tables implemented by HE 220 are stored in system memory 112, via memory interface 224. Embodiments of HE 220 might implement up to 1024 independent hash tables. Each hash table might be allocated dedicated static memory at system startup of network processor 100, but might also be dynamically allocated additional memory over time as network processor 100 operates. In some embodiments, additional memory is allocated dynamically to a hash table in 256 B blocks.

State Engine (SENG) 218 might perform functions of a finite state machine (FSM) that operates on received packets. For example, SENG 218 might perform statistics counts and run traffic shaper scripts. SENG 218 might store statistics data in system memory 112, via memory interface 224, and might employ a data cache to reduce accesses to system memory 112 when there are multiple accesses to the same location of system memory.

MPP 200 might generally be implemented as a multi-threaded engine capable of executing parallel functions. The multi-threading operation is performed by multiple contexts in MTIE 214. Some embodiments of MPP 200 might employ more than one MTIE 214 to support additional context processing. For example, MPP 200 might preferably include 4 MTIE cores, each capable of processing 32 contexts, for a total of 128 contexts. These contexts might be supported by 256 task identifiers (TIDs), meaning that contexts for up to 256 tasks might be concurrently active in MPP 200.

MPP 200 might typically receive input tasks via a task ring such as described in U.S. patent application Ser. No. 12/782,379 filed May 18, 2010. Additionally, MPP 200 might receive a timer event via a timer ring. Receiving a task or receiving a timer event results in a context being generated in MPP 200 corresponding to the received task or timer event. Upon receiving a task, MPP 200 reads the task from system memory 112, for example via communication interface 202 and memory interface 224. Communication interface 202 issues a task start request to MTIE core 214 via scheduler (SCH) 204. A typical task might include 32 bytes of parameter data, and a typical timer event might include 13 bytes of parameter data.

SCH 204 tracks MPP contexts and maintains a list of free contexts. Upon receiving a task start request, if a free context is available, SCH 204 issues a context start indication to one or more other modules of MPP 200 such that the various modules, if necessary, might initialize themselves to process the context. SCH 204 also maintains task template to root address table 228. Root address table 228 specifies the instruction entry point (e.g., the address of first instruction in flow memory 230) for a given task template. Root address table 228 might typically be loaded on initial configuration of MPP 200.

Upon receiving the context start indication from SCH 204, MTIE 214 initializes its internal context memory and loads the task parameters of the received task. MTIE 214 also loads the root address to use for the context from root address table 228, such that MTIE 214 can determine what processing to perform for the received input task. Upon receiving the context start indication from SCH 204, Data Buffer Controller 206 initiates a data read operation to read the packet data corresponding to the context from at least one of system memory 112 and external memory 116. HE 220, FBI 216 and PIC 210 reset various valid bits for error detection for the context.

After the context start indication is issued, SCH 204 issues a context schedule indication to MTIE 214. In response to the context schedule indication, MTIE 214 starts executing a first command stored at the location specified in root address table 228. The command might be stored in at least one of root tree memory 232, flow memory 230, and external tree memory 234. While executing the specified commands, MTIE 214 fetches tree instructions from either root tree memory 232 or external tree memory 234. MTIE 214 also fetches flow instructions from flow memory 230. Some embodiments might include a 16 KB flow memory for each MTIE core of MPP 200, and some embodiments might further allow the flow memory for multiple MTIE cores to be shared to increase the size of the flow memory for all MTIE cores.

Upon reaching a point in context processing that requires processing by a module of MPP 200 external to MTIE 214, MTIE 214 sends the context along with the corresponding function call and arguments to FBI 216. Once the context is delivered to FBI 216, the context might become inactive in MTIE 214 as, in general, a given context might only be active in one module of MPP 200 at any one time. FBI 216 provides the function call to the designated unit for execution via function bus 212. Although function bus 212 is shown in FIG. 2 as a single bus, some embodiments might employ more than one function bus 212, based on the type of module that is coupled to each bus. In general, function bus 212 might be employed to communicate between MTIE 214 and HE 220, PIC 210, SEM 222, PQM 208 and SENG 218.

Data Buffer Controller (DBC) 206 might implement the data buffer function. DBC 206 fetches PDU data for MTIE 214 from memory external to MPP 200 (e.g., one of system memory 112 or external memory 116). DBC 206 might issue a read indication signal and a read done indication signal to FBI 216 to schedule the read requests. DBC 206 might have up to 2 read requests pending at any time for a given context. FBI 216 might prevent context termination if DBC 206 has pending reads for the context.

For functions that are defined as ordered, FBI 216 sends out function calls in the order in which the contexts are started in MPP 200. For functions that are not defined as ordered, FBI 216 might send out function calls in the order they are received by FBI 216. FBI 216 might typically queue contexts so that generally newer contexts wait for the generally oldest context to be executed. FBI 216 also determines the routing of each function call to a destination module and determines whether the function returns any data upon completion. If a function call does not return data, then FBI 216 sends the context to SCH 204 when the destination module returns an indication that it has started processing the function call. If the function call does return data, then FBI 216 sends the context to SCH 204 after the data is returned to FBI 216 by the destination module. Upon receiving the data, FBI 216 sends the data to MTIE 214, and MTIE 214 writes the data to an internal memory (not shown). Once the returned data is written to memory, the context is provided to SCH 204. Additionally, FBI 216 might determine if a function call is a "terminating" function call that ends context processing by MPP 200. Terminating function calls might typically be issued by Pre-Queue Modifier 208 directly to SCH 204. When a terminating function call is processed, MPP 200 generates an output task that is communicated, for example, over a ring communication bus to a next module of network processor 100 for subsequent processing after MPP 200.

MPP 200 might track a virtual flow identifier (vflow ID) and an index (vflow Index) with each output task, indicative of what one(s) of cores 106 or accelerators 108 operate on a data packet after MPP 200 has finished its processing. Communication interface 202 generates an output task based on the vflow ID and vflow Index and the output task is transmitted, for example via a task ring, to the subsequent destination module. An input task might result in the generation of multiple output tasks. As described herein, MPP 200 maintains task order between input and output, such that output tasks are generated in the order in which the input tasks are received by MPP 200, and thus also the order in which the corresponding contexts are started in MPP 200.

SCH 204 starts a new context when new tasks are received by MPP 200. SCH 204 receives a Task ID (TID) that identifies the received task and starts a context by allocating a context number to associate with that task. The TID and context number might be passed on to other modules of MPP 200 when the context is started. A context is associated with this TID and context number until SCH 204 receives an indication that processing of the context is terminated. In general, a new context is started for a received task if the following conditions are true: (1) there are available contexts; and (2) a Task Start FIFO buffer has enough available entries for at least one complete task. To start a new context, SCH 204 reads task information from one or more Task Start FIFO buffer locations. The Task Start FIFO buffers might be FIFO buffers stored in an internal memory of SCH 204. SCH 204 starts a context by allocating a new context number and setting a status bit of the context, indicating that this context is ready to be scheduled. SCH 204 stores the task information in a Per-Context Memory (PCM) of SCH 204. The PCM might be addressed by context number. In some embodiments, the PCM is implemented as a two-port memory with one port dedicated to write context information, and one port dedicated to read context information. The context information might also be provided to other modules of MPP 200 when the context is started, allowing the modules to initialize any per-context memories for the new context.

As will be described, SCH 204 maintains a Classification Completion List (CCL). The CCL stores pointers to the contexts and control data, such as context start order, context number, and thread identifiers (THID), for each context. When a new terminating function is issued by PQM 208 to SCH 204, the terminating function is appended to the CCL after any older CCL entries for the corresponding context. The next newest context, for example the next context in the CCL linked list, is then started. When a context becomes the oldest context in MPP 200, SCH 204 reads the CCL contents and sends them to PQM 208 to form instructions to communication interface 202 to generate a corresponding output task that is, for example, based on a vflow ID, a vflow Index, and the actual packet data. SCH 204 might determine which context is the oldest if the context is the head entry of the CCL linked list. Alternatively, if SCH 204 employs more than one output queue, a CCL linked list might exist for each output queue, and, thus, SCH 204 might select the oldest context from one of the output queues, and sends that context to PQM 208. Since an ordering requirement between OQs is not necessary, any non-empty OQ might be selected (for example, using a round robin algorithm) to begin transmission.

The CCL location is freed for another context and the output task is sent to the next destination module of network processor 100. When a context is terminated, that context is not reallocated until all other modules of MPP 200 have acknowledged to SCH 204 that they are done processing the context. Thus, as described herein, SCH 204 provides context start and context complete information to other modules of MPP 200, and provides context scheduling information to MTIE 214. As will be described, MTIE 214 might also provide instruction breakpoint information to SCH 204.

In situations where one or more system resources are running low, SCH 204 might stop scheduling contexts that consume the resources. Thus, SCH 204 might place a context in a "parked mode". While a context is parked, SCH 204 will not schedule it to MTIE 214. SCH 204 might place a context in parked mode for any of the following cases. For case (1), the context is placed in a parked mode when free locations in the Classification Completion List (CCL) are below a minimum threshold, thus becoming at risk of not being able to satisfy all active contexts. In this condition, any context that allocates a new CCL location, and is not a terminating function, is parked by SCH 204. A context parked for this reason remains parked until free locations in the CCL are above the minimum threshold. For case (2), the context is placed in a parked mode when PQM 208 instruction memory is below a minimum threshold and at risk of not being able to satisfy all the active contexts. In this condition, any context that uses PQM instruction memory is parked by SCH 204. A context parked for this reason remains parked until free PQM instruction memory is above the minimum threshold. In some embodiments, contexts parked for either cases (1) or (2) might remain parked until the tests for both cases (1) and (2) are satisfied, for example, that free locations in the CCL are above the minimum threshold and free PQM instruction memory is above the minimum threshold. For case (3), the context is placed in a parked mode when SCH 204 parks a context due to an instruction breakpoint, which might be performed for diagnostic purposes. Thus, a context might be parked due to system resources being below a minimum (e.g., one or both of free locations in the CCL and free PQM instruction memory) or a context might be parked because of an instruction breakpoint.

The instruction breakpoint mechanism allows stepping through software code using a configuration-specified instruction breakpoint. As will be described, when a MTIE 214 executes an instruction that has a breakpoint set, and a breakpoint mode is enabled, MTIE 214 signals SCH 204 to park the context. Multiple contexts might be parked in this manner in a single clock cycle, since each of the one or more MTIE modules has an independent interface to SCH 204. Upon reaching an instruction having a breakpoint, MTIE 214 might send the context to SCH 204 with a corresponding breakpoint indication set. Upon receiving a context with the breakpoint indication set, SCH 204 might request all of the one or more MTIE modules to send all the active contexts to SCH 204 and put the contexts in instruction breakpoint park mode. Once SCH 204 has received control over all active contexts, SCH 204 might generate an interrupt, for example, to one of the various μP cores 106 of network processor 100.

Through debug interface 236, a module external to MPP 200, for example the one of μP cores 106 that received the interrupt, might interrogate the state of MTIE 214, SCH 204, and other modules of MPP 200. After the one of μP cores 106 that received the interrupt is finished interrogating the state of MPP 200, the interrupt might be cleared to return MPP 200 to a running state, for example by clearing the scheduler control register. When returned to a running state, SCH 204 clears the instruction breakpoint park for all contexts, allowing them to be rescheduled to MTIE 214. When not in breakpoint mode, for each clock cycle, SCH 204 attempts to pick a context to schedule to MTIE 214, based on the status of the contexts, for example, contexts with a "ready" status and that are not parked. When SCH 204 is in breakpoint mode, no contexts are rescheduled, and no new contexts are started.

MTIE 214 includes flow memory 230. Flow memory 230 might be 24 bits wide and 16 KB in size. The first (e.g., lowest addressed) flow instructions might be stored in the flow instruction cache of flow memory 230, while subsequent instructions (e.g., higher addressed flow instructions) might be mapped by a base register of MTIE 214 and stored in external tree memory 234. In exemplary embodiments, MPP 200 might include 1, 2, 4, 6 or 8 MTIE cores. In embodiments with multiple MTIE cores, the flow memory of one or more cores might be joined together to increase the flow memory size for the overall group of MTIE cores. In general, flow memory 230 might have a lower read latency versus external tree memory 234.

MTIE 214 includes root tree memory 232. Root tree memory 232 might include 1K of memory and might contain the first 1024 tree instructions for zero latency instruction access. In general, root tree memory 232 might have a lower read latency versus external tree memory 234. To improve the read latency of external tree memory 234, data might be duplicated across one or more locations of external tree memory 234. For example, as will be described, one logical address might be mapped to one or more physical addresses in external tree memory 234. The contents of the tree memory might be duplicated across one or more physical memory banks of external tree memory 234 to reduce memory contention for frequently accessed instructions.

Described embodiments reduce the average latency of read requests to a memory that is read by one or more requestors, where the memory might include two or more substructures (e.g., multiple banks of DRAM). In such a system, a latency penalty might be incurred for read requests to the same substructure sequentially, and the average latency of read requests might be reduced by having multiple copies of the same data in multiple memory substructures. In such an embodiment, a requestor might initiate a read request to the substructure that holds a copy of the data that will incur the smallest latency. This decision might be based on knowledge of prior requests and which data is duplicated. In described embodiments, the address of the read request is used to lookup the availability of duplicated data from a programmable table based on address ranges.

Embodiments of the present invention further provide that the data to be duplicated can be chosen as less than all the data, based on usage statistics of the data and the size of available memory. For example, heavily used data might be duplicated in all of the memory substructures to minimize access time, while infrequently used data would have fewer copies or not be duplicated at all, allowing more overall data to be stored in the memory. Thus, the level of data duplication is configurable based on the requirements of a given implementation of network processor 100.

Figure 3:
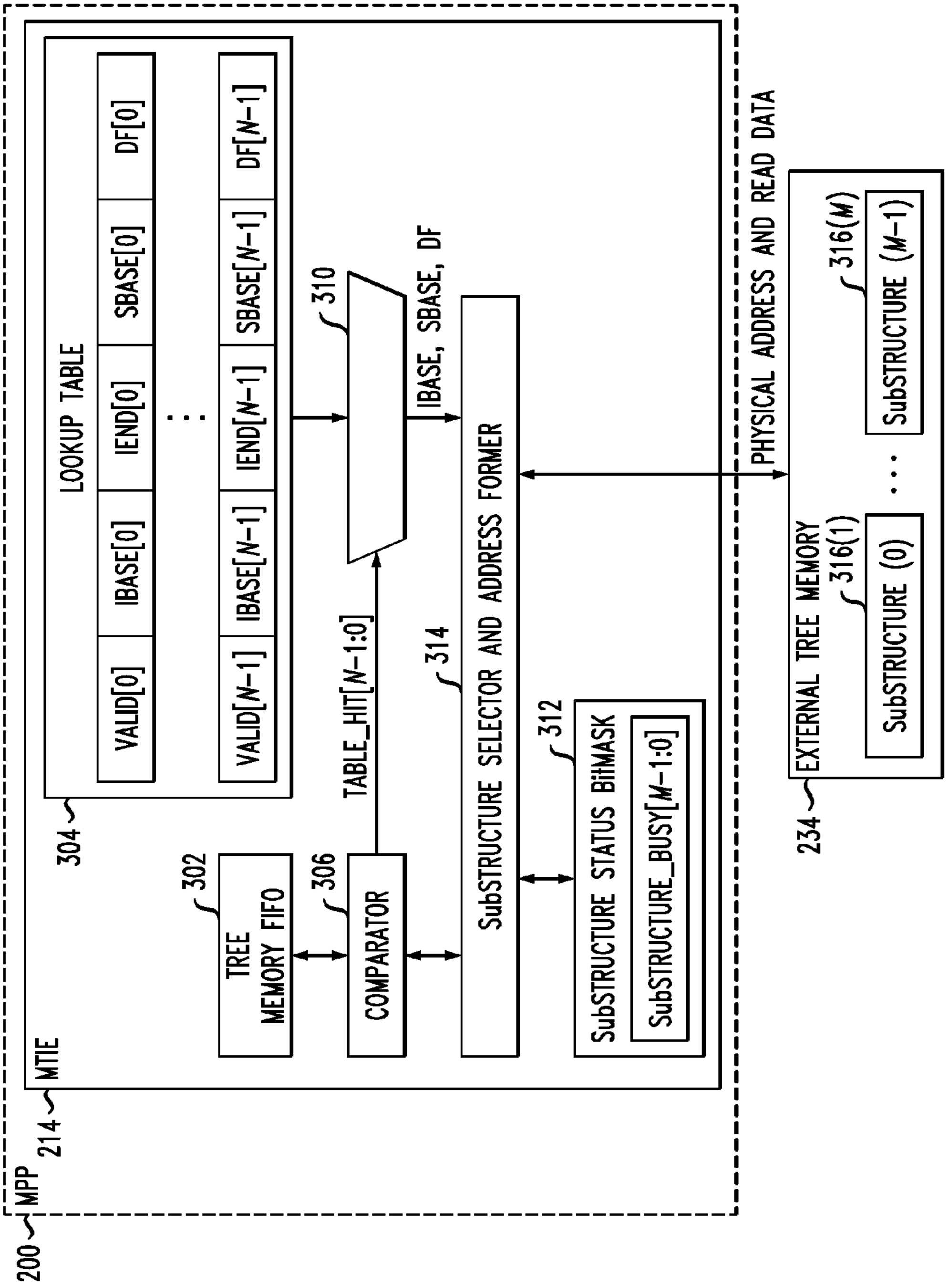
FIG. 3 shows a block diagram of an exemplary memory interface of the modular packet processor of FIG. 2.

FIG. 3 shows a block diagram of exemplary tree memory 234. As shown, external tree memory 234 includes having M substructures, 316(1)-316(M), where M is a positive integer. MTIE 214 might include lookup table 304, which has N entries, where N is a positive integer, each corresponding to a number of different data regions with different types of duplication that could be defined for the overall memory structure.

For example, additional table entries allow additional substructures to be supported. The number of bits used for the address, address ranges and table comparisons might define a minimum granularity of each address range per memory substructure. Each of the N table entries includes a valid indication (Valid), an address range (IBASE and IEND), and a data duplication structure base address (SBASE) and a data duplication factor (DF).

When MTIE 214 requires data from one of root tree memory 232 and external tree memory 234, MTIE 214 sends a read request external tree memory 234. Read requests might be temporarily stored in tree memory FIFO 302. Comparator 306 compares at least a portion of the requested address against the entries of lookup table 304. Comparator 306 returns the value Table_Hit, which is a match indication for the table index whose address range included the request address. For example, when the requested address is less than or equal to the ending address of the address range (IEND[N]) and is greater than or equal to the base address of the address range (IBASE[N]), and when the corresponding valid indication (Valid[N]) is set. For example, in described embodiments, MTIE 214 might perform the address range comparison: Table_Hit[N−1:0]=(Valid[N] && (IBASE[N]<= Request Address<=IEND[N])). The information about how the data in that address range is duplicated (DF[N]) and any other information (SBASE[N]) required to transform the request address into an actual structure address is read by SubStructure Selector and Address Former 314 from the matching entry of lookup table 304 defined by the Table_Hit value, and selected by multiplexer 310.

MTIE 214 might also maintain a corresponding "busy" indicator for each memory substructure, for example, SubStructure Status BitMask 312, which includes a bitmask of SubStructure_Busy[M−1:0]. Based on the requested address, address translation information is read from the table and, based on the address translation information and the "busy" state of the memory substructure that includes the requested address, SubStructure Selector and Address Former 314 might determine a memory address to read that would result in the minimum latency. SubStructure Status BitMask 312 is updated for the substructure that receives the request, allowing its ability to accept future requests to be tracked.

FIGS. 4-6 show additional exemplary conditions for accessing root tree memory 232 and external tree memory 234. Although FIGS. 4-6 show the exemplary case where external tree memory 234 employs two memory banks, other numbers of memory banks are possible. An exemplary embodiment of the present invention might desirably employ 8 memory banks, where some or all data could be duplicated in 0, 2, 4 or all 8 memory banks. When a single requestor accesses a tree memory with 2 memory banks of 8 addresses per bank, part of the structure address might indicate the memory bank, part of the structure address might indicate the address within the bank. Typically, there might be a one clock cycle latency penalty for accessing a bank that was accessed the prior clock cycle. In the exemplary case of two memory banks, if the base address of the tree memory is 0, such that the valid structure addresses for the memory are 0-15, even addresses might be located in bank 0 and odd addresses in bank 1, such as shown in FIGS. 4-6. A table duplication factor of 0 indicates no duplication for the data and a duplication factor of 1 indicates the data is duplicated in both banks.

SubStructure Status BitMask 312 might include one bit per memory bank. SubStructure Status BitMask 312 might set an indicator, such as a flag bit, for one cycle after a bank was accessed to indicate that the corresponding memory bank is busy for one clock cycle to process a read request. The indicator for the corresponding memory bank might clear the following clock cycle to indicate that the memory bank is available to accept new read requests. For substructures that have more than a one clock cycle latency penalty between requests, their status could be tracked with a counter, shift register or some similar mechanism to indicate their busy status over multiple clock cycles. For dynamic substructures that require periodic refresh cycles, the refresh status of the structures might also be tracked and used as input to at least one of SubStructure Selector and Address Former 314 or SubStructure Status BitMask 312.

FIG. 4 shows an exemplary case where data is not duplicated in one or more substructures of external tree memory 234. In the exemplary case of FIG. 4, external tree memory 234 has 2 memory banks, each with 8 memory addresses, as described above. Also as described above, some embodiments of the present invention might employ additional memory banks, and each memory bank might include more than 8 memory addresses. Valid values of the request address of MTIE 214 would be all possible addresses, 0-15 (4 bits for 16 unique addresses). As shown, in this case lookup table 304 would have just one entry with IBASE and IEND set to include the entire address range (IBASE=0 and IEND=15). The DF value is set to 0 indicating no duplication. The SBASE value is 0, indicating memory bank 0, and the storage address generated by SubStructure Selector and Address Former 314 is the same as the request address. If there are back-to-back read requests to the same memory bank, the second read request is stalled for a clock cycle until the first read request is issued, as described above with regard to SubStructure Status BitMask 312. For example, if the first request is to bank 0, SubStructure_Busy[0] is set to indicate bank 0's busy status. Upon receiving the second request, SubStructure Selector and Address Former 314 sees SubStructure_Busy[0] is set and waits another clock cycle before issuing the read request. Request addresses 0-15 map to structure addresses 0-15, as shown.

FIG. 5 shows the exemplary case where data is duplicated completely between both banks. Valid values of the request address are limited to the values 0-7 (8 unique items) instead of 0-15 (16 unique items). Lookup table 304 has one entry with IBASE and IEND set to include the limited address range (IBASE=0 and IEND=7). The DF value is set to 1 indicating that all data exists in both banks. The SBASE value is 0, indicating memory bank 0, and the storage address generated by SubStructure Selector and Address Former 314 is formed by concatenation of the lower 3 bits of the request address and the bit that indicates the selected bank.

If there are back-to-back read requests, SubStructure Selector and Address Former 314 might provide the first read request to either memory bank. SubStructure Selector and Address Former 314 might provide the second read request to the bank that was not selected for the first read request. For example, if the first request went to bank 0, it would set SubStructure_Busy[0] to indicate bank 0's busy status. For the second request in the next clock cycle, SubStructure Selector and Address Former 314 reads SubStructure_Busy [0] indicating that bank 0 is busy, sends the second request to bank 1, and sets SubStructure_Busy[1] to indicate bank 1's busy status. For a third request in the next clock cycle, SubStructure_Busy[0] indicates that bank 0 is available, and SubStructure_Busy[1] indicates that bank 1 is busy, and the third read request is sent to bank 0, and so on, for subsequent read requests. Request addresses 0-7 map to structure addresses 0-7 and 8-15.

FIG. 6 shows the exemplary case where the first 8 data items are not duplicated, but the next 4 data items are duplicated across both memory banks. Valid values of the request address are limited to the values 0-11 instead of 0-15 (12 unique items). As shown, lookup table 304 has two entries with the following information:

Table[0]: IBASE=0, IEND=7, SBASE=0, DF=0 (locations 0-7 not duplicated), and Table[1]: IBASE=8, IEND=11, SBASE=4, DF=1 (locations 8-11 duplicated).

For data addresses that are not duplicated (e.g., DF=0), the storage address is the request address (e.g., 0-7). For data addresses that are duplicated, the storage address might be formed by SubStructure Selector and Address Former 314 by concatenating the request address with one or more values from lookup table 304. SubStructure Selector and Address Former 314 might form the storage address by performing the concatenation: (Requested Logical Address−IBASE+SBASE) and, if data duplication is enabled (e.g., DF=1), and shifting the result by a number corresponding to the number of memory banks with the data duplication. As shown in FIG. 6, request addresses 0-7 map to structure addresses 0-7, and request addresses 8-11 map to structure addresses 8 and 9, 10 and 11, 12 and 13, and 14 and 15, respectively.

For example, in the exemplary case shown in FIG. 6 where some data is duplicated across two memory banks, a requestor might attempt to access the data stored in logical address 9, which is duplicated in physical address 10 in memory bank 0, and physical address 11 in memory bank 1. As shown, to access logical address 9, IBASE is equal to 8 and SBASE is equal to 4. Thus, the calculation (Requested Logical Address−IBASE+SBASE) results in: 9−8+4=5. This resulting value is then left shifted by a number of bits corresponding to the number of memory banks with data duplication, since DF=1. In the exemplary case shown in FIG. 6, two memory banks are employed. Thus, the resulting value is left shifted by one bit, which, depending on the value of the new least significant bit, results in the value 5 (101) being left shifted by one bit (101×), which could be either address 10 (1010) or address 11 (1011). If more than 2 memory banks are employed, the result might be shifted correspondingly by additional bit places. The value of the new least significant bit might be selected by SubStructure Selector and Address Former 314 based on, for example, the SubStructure_Busy status values of memory bank 0 and memory bank 1. Thus, logical address 9 corresponds to physical addresses 10 and 11, and one of the physical addresses is chosen based on the availability of the corresponding memory banks.

Alternatively, in the exemplary case shown in FIG. 6 where some data is duplicated across two memory banks, a requestor might attempt to access the data stored in logical address 6, which is not duplicated. As shown, to access logical address 6, IBASE is equal to 0 and SBASE is equal to 0. Thus, the calculation (Requested Logical Address−IBASE+SBASE) results in: 6−0+0=6. This resulting value is not left shifted by a number of bits corresponding to the number of memory banks with data duplication, since DF=0. Thus, the physical address and the logical address are equal. Although shown in FIGS. 4-6 as having two banks, the present invention is not so limited, and additional memory banks might be employed.

Table 2 defines terms used herein as an aid to understanding the described embodiment:

TABLE 2

| | |
|---|---|
| Packet processing system ("PPS") | a system that receives packets from one or more sources, performs some function(s) on those packets, and sends packets out to one or more destinations |
| Thread | the product of a PPS receiving one or more input packets and combining them into a new packet, which might then be output from the PPS. |
| Scheduler ("SCH") | a component in a PPS that receives information from one or more input packets comprising one or more threads, and is responsible for scheduling the transmission of completed threads. |
| Thread Start ("TS") | notification received by SCH for the first input packet for a particular thread. The SCH defines a maximum number of threads it may simultaneously have in progress, and prevents any new threads from being started if this limit is reached. |
| Classification Completion List ("CCL") | a linked-list structure used by the SCH to store information needed for the transmission of a portion of a thread (e.g., from a particular input packet). A sequence of one or more entries in the CCL (one per input packet) contains information for the SCH to transmit the entire thread. The CCL stores this information in the order in which the input packets are received by the SCH, but is read in the wire order, as described herein. |
| Output Queue ("OQ") | a structure used by the SCH to specify the transmission order for a subset of threads managed by the SCH. The SCH may support multiple Output Queues. Each thread specifies its Output Queue to use, sometime after the thread is started, and before or coincident with the first input packet for the thread. |
| Thread ID ("THID") | a unique identifier used to refer to a particular thread that is in progress. |
| Per-Thread Table ("PTT") | a table used by the SCH table (addressed by THID) to record information about a particular thread, including its location in the CCL. |
| Oldest Unspecified List ("OUL") | a list used by the SCH to track the order in which the TS were received for each thread in progress. The oldest thread in the list is removed after it has specified its OQ. |
| Queue Table ("QT") | a table used by the SCH to track the OQ specified for each THID. |
| Reassembly | the product of a PPS receiving one or more input packets and combining them into a new packet, which may then be output from the PPS |
| Packet Accumulation Component ("PAC") | PPS component that creates reassemblies from input packets and optionally sends them to an output |
| Per-reassembly State | state (information, data) that a PAC maintains for each reassembly. The PAC uses this state when processing input packets, each of which refers to a particular reassembly. The PAC stores this state in system memory 112. |
| Enqueue Packet | An input packet to be added to the indicated reassembly |
| Transmit Packet | An input packet to be transmitted in an output packet |

MPP 200 might typically employ multi-threaded processing to interface with high latency memory systems. As input packets arrive, MPP 200 starts a thread by sending a Thread Start (TS) indication to SCH 204. A new thread might start execution even when an older thread has not completed execution. A newer thread might complete execution before an older thread has completed execution. SCH 204 might include multiple output queues (OQ), and each thread might specify its corresponding OQ before starting output transmission. SCH 204 maintains "wire order" on a particular OQ, meaning that each OQ transmits the packets for a given thread contiguously in the order in which the threads were started, regardless of any interleaving of the input packets between threads. Embodiments of the present invention allow efficient implementation of wire order transmission in a multi threaded, multi OQ system. Described embodiments provide SCH 204 to efficiently transmit threads in the order in which they were started, and to select them from multiple OQs.

As described herein, MPP 200 transmits packets in wire order. Tables 3-5 show an exemplary condition for processing packets of 3 threads in a system employing two output queues (OQ0 and OQ1). As shown in Tables 3-5, below, an ordering requirement is not necessarily required between OQ0 and OQ1. In these tables, the OQ is shown as being specified in the TS indication, but the OQ corresponding to a thread might be specified at any time up until or coincident with MPP 200 receiving the first packet for a given thread.

TABLE 3

| Input Packet Arrival Order into Scheduler 204 | |
|---|---|
| Thread 0: Start, OQ 0 | First to Arrive |
| Thread 1: Start, OQ 0 | |
| Thread 2: Start, OQ 0 | |
| Thread 3: Start, OQ 1 | |
| Thread 2: Packet 0 | |
| Thread 1: Packet 0 | |
| Thread 3: Packet 0 | |
| Thread 1: Packet 1 | |
| Thread 2: Packet 1 | |
| Thread 0: Packet 0 | |
| Thread 3: Packet 1 | |
| Thread 2: Packet 2 | |
| Thread 2: Packet 3 | |
| Thread 1: Packet 2 | |
| Thread 0: Packet 1 | Last to Arrive |

TABLE 4

| Required Output Packet Order from Scheduler 204 OQ 0 | |
|---|---|
| Thread 0: Packet 0, 1 | First output from OQ0 |
| Thread 1: Packet 0, 1, 2 | |
| Thread 2: Packet 0, 1, 2, 3 | Last output from OQ0 |

TABLE 5

| Required Output Packet Order from Scheduler 204 OQ1 | |
|---|---|
| Thread 3: Packet 0, 1 | First/Last output from OQ1 |

Tables 3-5 show an exemplary case of a last overall packet received for various active threads. When the last packet for a particular thread is transmitted, it is an indication for the next thread in that particular OQ (if any) to begin transmission.

One embodiment of MPP 200 might transmit the thread for the first input packet to arrive, and continue transmitting each input packet as it arrives, enqueuing all other input packets (those for other threads) into a relatively large queue. After the last input packet is received for the given thread, SCH 204 begins processing the next oldest entry in the queue (deleting it from the head of the queue), and traverses the queue from oldest to newest, extracting (and transmitting) any entries that pertain to the next thread. If any input packets were received for that thread while SCH 204 was traversing the queue, SCH 204 enqueues that input packet into the large queue. If SCH 204 reached an entry which was the last entry for that thread, SCH 204 would then begin transmitting a new thread starting with the (next) oldest queue entry, starting back at the head of the queue. SCH 204 continues this algorithm unless or until the queue was empty. If SCH 204 traversed the entire queue without finding the last entry for the thread, SCH 204 stops transmitting until the last input packet for that thread was received. This embodiment might be relatively inefficient since the entire queue would need to be repeatedly traversed; if there were a large number of threads in progress, this could take a very long time. This embodiment requires a large amount of memory for SCH 204 to support a large number of simultaneously-active threads.

Figure 7:
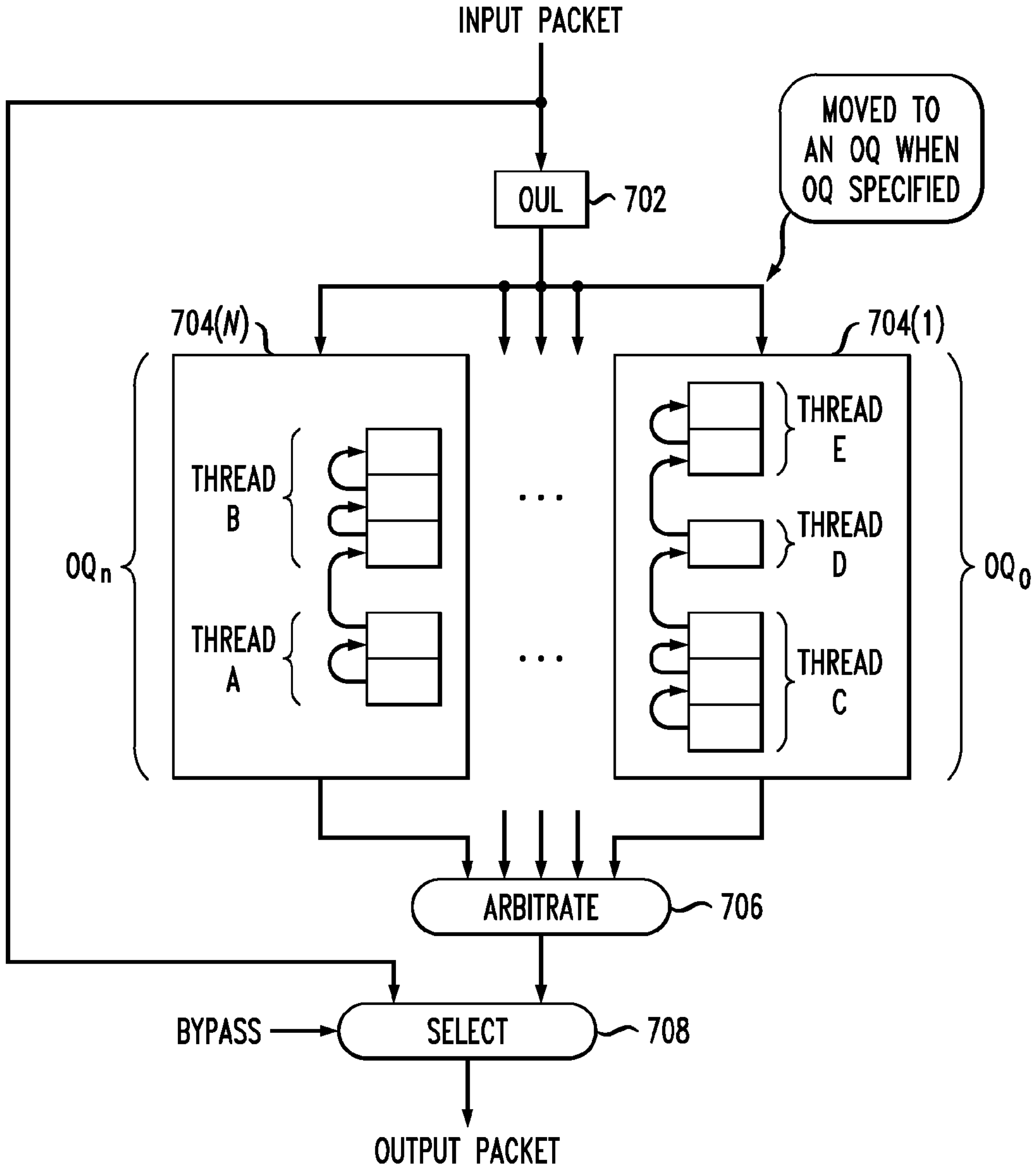
FIG. 7 shows a block diagram of an exemplary thread information flow from input packets to output packets in accordance with exemplary embodiments of the present invention.
Figure 8:
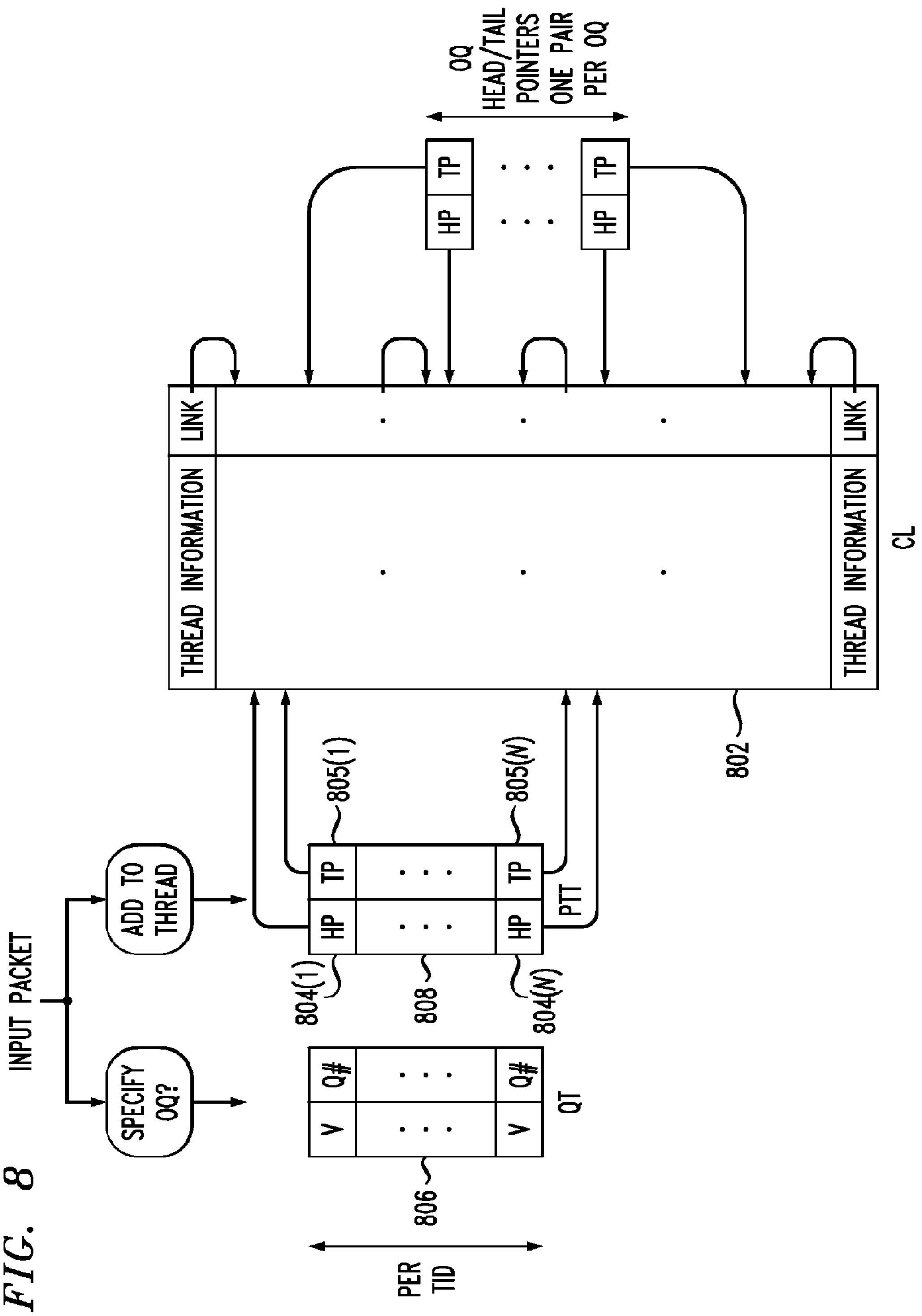
FIG. 8 shows a block diagram of an output queue system in accordance with exemplary embodiments of the present invention.

FIG. 7 illustrates how thread information flows from input packets to output packets through OUL 702 and OQs 704(1)-704(N). The OQs are linked lists whose links are stored in CCL 802. FIG. 8 shows Classification Completion List (CCL) 802 and other pointer structures, including organization of the OQ and per-THID link information. The information in Queue Table (QT) 806 and Per-Thread Table (PTT) is employed by SCH 204 to update the links within CCL 802 in order to maintain each thread's linked list and each OQ's linked list.

As shown in FIG. 8, another embodiment of MPP 200 might include CCL 802, which is a linked-list structure used by SCH 204 to store information for the transmission of a portion of a thread (e.g., from a particular input packet). A sequence of one or more entries in CCL 802 (one entry per input packet) contains information for SCH 204 to transmit the entire thread. CCL 802 stores the information in the order in which the input packets are received by SCH 204. However, CCL 802 is read in the wire order.

As described, CCL 802 is a linked list which stores information necessary to transmit a particular input packet associated with a particular thread. Each CCL entry includes a link pointer to another CCL entry (either the next CCL entry for that thread, or the first entry of the next thread in the same OQ). Each CCL entry also stores the thread identifier (THID) of the thread and an indication if the entry is the last CCL entry for the thread (not necessarily the last in the OQ). The entries for a given thread stored in CCL 802 are linked to each other. Threads that have specified their OQ have their smaller linked lists within CCL 802 linked together.

SCH 204 maintains a Head Pointer (shown as 804(1)-804(N)) and a Tail Pointer (shown as 805(1)-805(N)) in Per-Thread Table (PTT) 808 for each OQ 704(1)-704(N). The HP points to the oldest CCL entry for a given OQ. The oldest CCL entry is the next entry to be transmitted for that queue. The TP points to the newest (last) CCL entry for the given OQ.

Oldest Unspecified List (OUL) 702 is a list used by SCH 204 to track the order in which the TS indications were received for each thread. The oldest thread in the list is removed after it has specified its OQ. OUL 702 is an ordered list of THIDs for which SCH 204 has received a TS. The oldest entry is not read from OUL 702 until it has specified its OQ.

Queue Table (QT) 806 is a table used by SCH 204 to track the OQ specified for each THID. QT 806 is a per-THID table that records the OQ number specified for a given THID, and a valid bit indicating whether or not that THID has yet specified its OQ number. PTT 808 records, for each THID, the head pointer (oldest) and tail pointer (newest) entry for that thread within CCL 802. At a given point in time, these smaller linked lists may or may not be linked to other linked lists within CCL 802, depending on whether or not the thread has been moved out of the OUL.

When SCH 204 receives an indication of the start of a thread, SCH 204 records the TS indicator in OUL 702. Entries in OUL 702 are written in the order in which the threads are started, and read in the same order. Before, or coincident with when SCH 204 receives the first input packet for a thread, SCH 204 receives an indication of which OQ the thread is to use. SCH 204 records this OQ number in QT 806 and sets the valid bit for that QT entry. When SCH 204 receives an input packet for a thread, it updates PTT 808. A new CCL entry is allocated for the input packet, and the corresponding HP and TP of PTT 808 for that THID are updated to link in the new CCL location. If this is the first packet for the thread, PTT 808 HP and TP are both set to point to the new CCL entry. If there are already one or more CCL entries for the thread, the oldest CCL entry link is pointed to the new CCL entry, and PTT 808 TP is set to point to the new CCL entry. The information necessary to transmit the packet is also written to CCL 802, as well as the indication of whether or not the packet is the last one for this thread.

While a thread is in OUL 702, OUL 702 might receive input packets. If the thread is not the oldest OUL entry, and the oldest entry has not yet specified its OQ (that is, the valid bit in the QT is still 0), the thread must remain in OUL 702. The corresponding entry of PTT 808 for the thread is updated, but the thread is not yet "moved" out of OUL 702 (e.g., not linked to an OQ). When the oldest thread in OUL 702 has specified its OQ, the thread is moved into CCL 802 in the specified one of OQs 704(1)-704(N).

Figure 9:
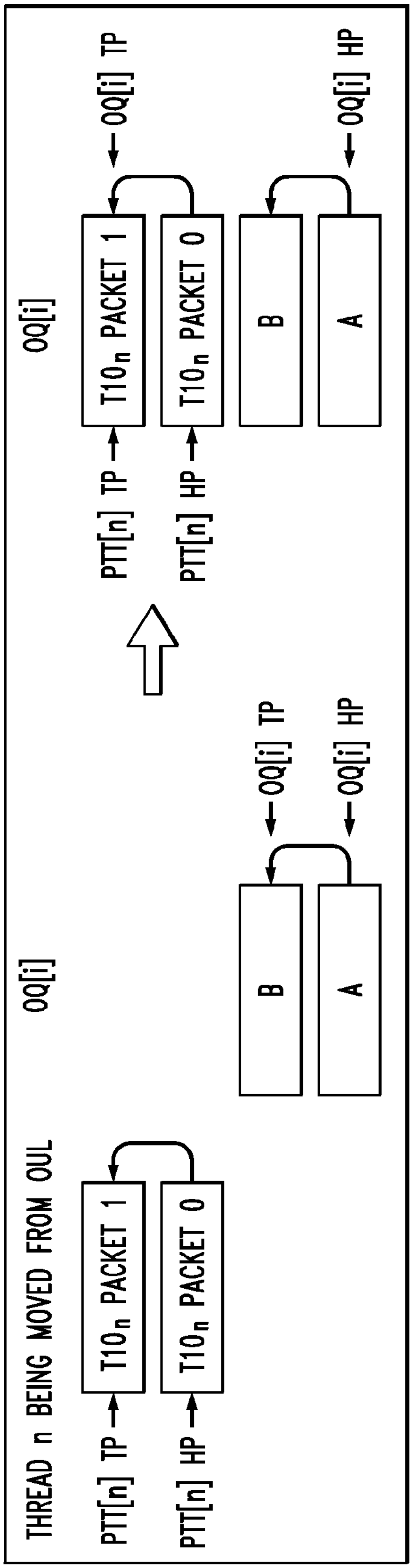
FIG. 9 shows an exemplary process diagram for moving a non-empty thread to a non-empty one of the output queues of FIG. 8.
Figure 10:
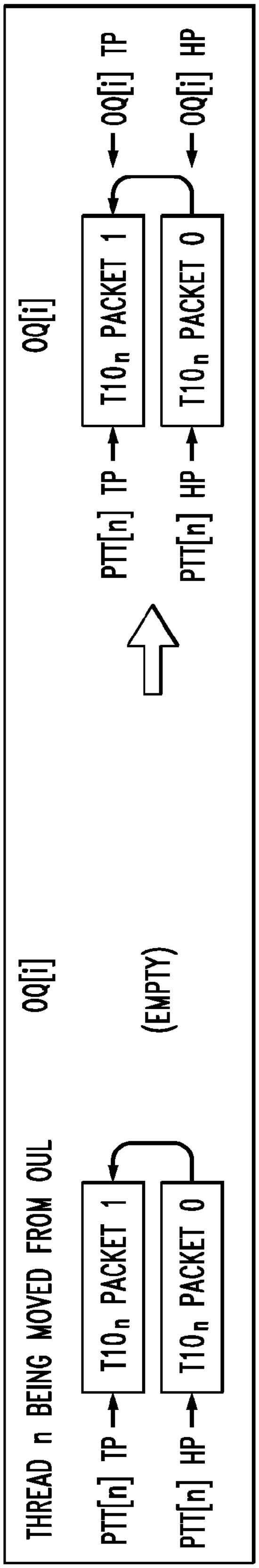
FIG. 10 shows an exemplary process diagram for moving a non-empty thread to an empty one of the output queues of FIG. 8.
Figure 11:
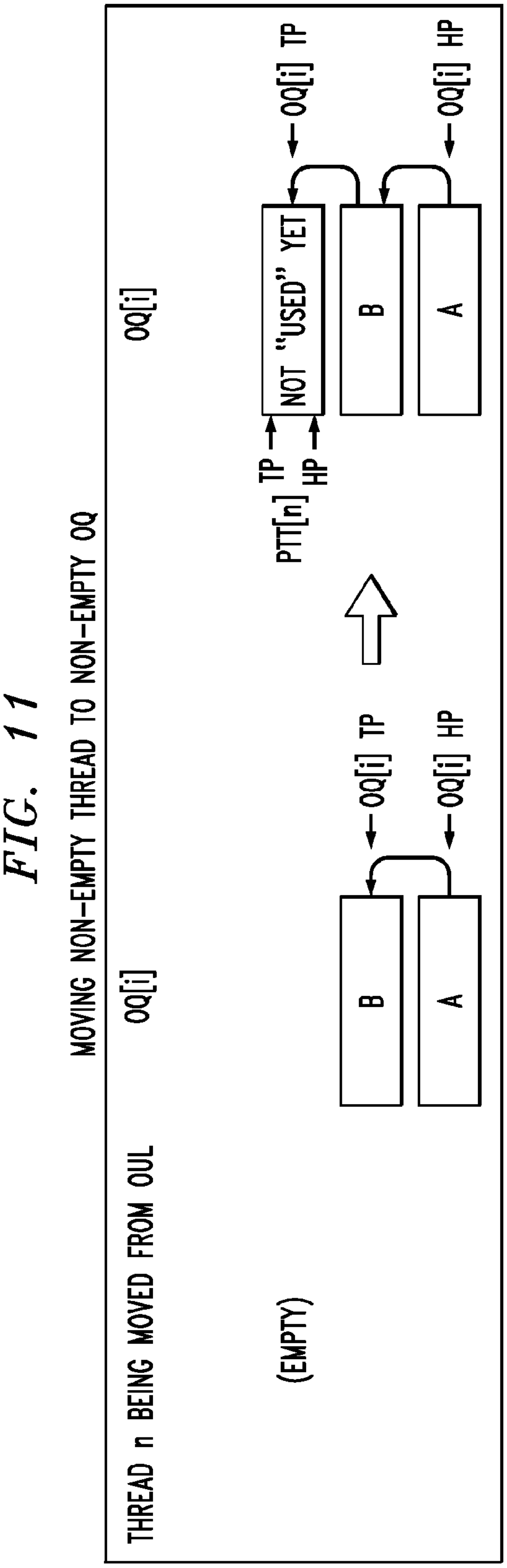
FIG. 11 shows an exemplary process diagram for moving an empty thread to a non-empty one of the output queues of FIG. 8.
Figure 12:
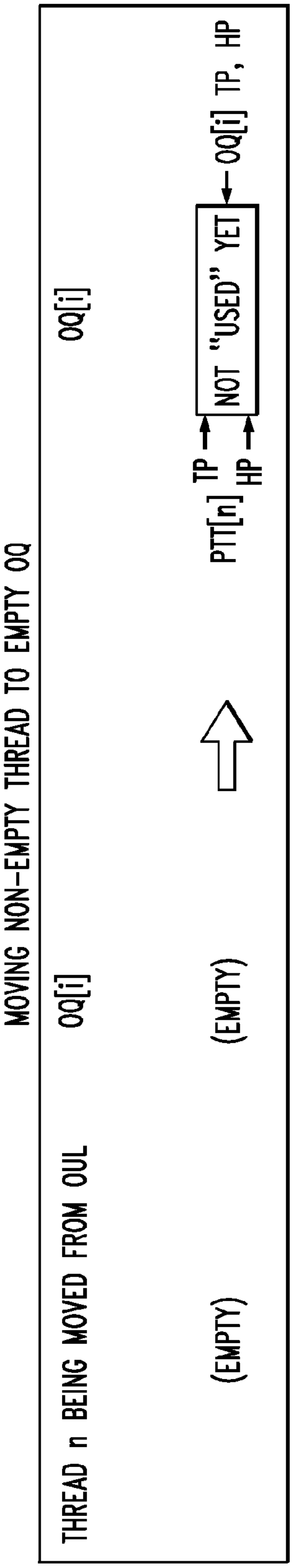
FIG. 12 shows an exemplary process diagram for moving an empty thread to an empty one of the output queues of FIG. 8.

As shown in FIG. 9, if the thread from OUL 702 already has one or more input packets, and the OQ currently linked into is not empty, then the entry of CCL 802 that is pointed to by the current OQ TP is linked to the HP of the thread (recorded in PTT 808), and the OQ TP is set to the TP of the thread (from PTT 808). As shown in FIG. 10, if the thread from OUL 702 already has one or more input packets, and the OQ being linked into is empty, then the HP and TP for the OQ are set to the HP and TP for the thread as stored in PTT 808. As shown in FIG. 11, if the thread from OUL 702 does not have any input packets, and the OQ being linked into is not empty, then a CCL entry is allocated and written with an indication that the entry has not yet been "used" by an input packet. The CCL entry pointed to by the current OQ TP is linked to the new CCL entry, and the OQ TP is set to point to the new CCL entry. As shown in FIG. 12, if the thread from OUL 702 does not have any input packets, and the OQ being linked into is empty, then a CCL entry is allocated and written with an indication that the entry has not yet been "used" by an input packet, and the HP and TP for the queue are set to the new CCL entry.

FIGS. 9-11 and Tables 6-9 show the effect on the pointers and CCL when moving an entry from OUL 702 to one of OQs 704(1)-704(N), in each of the four scenarios described above. As described, FIG. 9 shows Moving a Non-empty Thread to a Non-Empty OQ, FIG. 10 shows Moving a Non-empty Thread to an Empty OQ, FIG. 11 shows Moving an Empty Thread to a Non-Empty OQ, and FIG. 12 shows Moving an Empty Thread to an Empty OQ. After the sequence of input listed in Table 3, SCH 204 structures supporting this invention would appear as shown below in Tables 6-9. Table 6 shows the contents of OUL 702 before any threads have been moved out of it. Table 7 shows the contents of QT 806, Table 8 shows CCL 802 after the threads have been moved into the CCL, and Table 9 shows the contents of PTT 808.

TABLE 6 contents of OUL 702

| | |
|---|---|
| THID 3 | Newest |
| THID 2 | |
| THID 1 | |
| THID 0 | Oldest |

TABLE 7 contents of QT 806

| THID | Queue Number | Valid |
|---|---|---|
| 0 | 0 | 1 |
| 1 | 0 | 1 |
| 2 | 0 | 1 |
| 3 | 1 | 1 |
| 000 | X | X |
| n | X | 0 |

TABLE 8 contents of CCL 802

| | CCL location | Contents | Link (next CCL location) | Last in Thread | Head/Tail Pointers |
|---|---|---|---|---|---|
| Last location written | 10 | THID 0, Packet 1 | 1 | 1 | |
| | 9 | THID 1, Packet 2 | 0 | 1 | |
| | 8 | THID 2, Packet 3 | X | 1 | OQ0 TP |
| | 7 | THID 2, Packet 2 | 8 | 0 | |
| | 6 | THID 3, Packet 1 | X | 1 | OQ1 TP |
| | 5 | THID 0, Packet 0 | 10 | 0 | OQ0 HP |
| | 4 | THID 2, Packet 1 | 7 | 0 | |
| | 3 | THID 1, Packet 1 | 9 | 0 | |
| | 2 | THID 3, Packet 0 | 6 | 0 | OQ1 HP |
| | 1 | THID 1, Packet 0 | 3 | 0 | |
| First location written | 0 | THID 2, Packet 0 | 4 | 0 | |

TABLE 9 contents of PTT 808

| THID | HP (CCL Entry) | TP (CCL Entry) |
|---|---|---|
| 0 | 5 | 10 |
| 1 | 1 | 9 |
| 2 | 0 | 8 |
| 3 | 2 | 6 |

When there are any non-empty OQs, transmitting threads might be permitted to start. Since an ordering requirement between OQs is not necessary, any non-empty OQ might be selected (for example, using a round robin algorithm) to begin transmission. Once an OQ is selected, the selected OQ is the only OQ to transmit until the end of the thread is reached, which can be determined by examining the "Last" bit stored in the CCL. To transmit a thread, SCH 204 selects a non-empty OQ and begins reading locations from CCL 802 using the OQ HP for the selected queue. If SCH 204, when it selects an OQ to transmit, is in the middle of a current transmission, SCH 204 stays in this mode until it reads a CCL entry which has the Last bit set.

Before transmitting, SCH 204 examines the oldest entry in the OQ (the CCL entry pointed to by the OQ HP). If the next entry to be read has a different THID than the last entry read, and the previous entry did not have the Last bit set, SCH 204 stops transmitting until the next (and possibly last) packet for the thread is received. In this case SCH 204 enters "Bypass Mode", and records the THID of the thread which SCH 204 is in the middle of transmitting. SCH 204 also enters "Bypass Mode" if the OQ becomes empty after reading a location which did not have the Last bit set. Otherwise, if SCH 204 reads and transmits an entry which has the Last bit set, then it is no longer in the middle of transmitting a thread and may select any non-empty OQ for the next thread to transmit.

While SCH 204 is in Bypass Mode, if it receives a new input packet it examines the THID for the packet. If the THID matches the THID for which it is in Bypass Mode (the bypass THID), then the packet information is passed right to the output, bypassing the CCL. SCH 204 remains in this mode until such an input packet is received which has the Last bit set. If input packets are received which do not match the bypass THID, SCH 204 handles the input packet in a normal manner by adding the input packet to OUL 702 and/or CCL 802. A particular THID is not necessarily reused by MPP 200 until the THID has at least been moved from OUL 702 to CCL 802. At that time, the valid bit in the QT is reset to 0.

In the case where an empty thread is linked into an OQ, and a CCL entry might be allocated but not yet used, the next (first) input packet for that thread might use the CCL entry. One possible alternative implementation would be to not move the oldest OUL location into its OQ until the first input packet is received for that thread; with that alternative, there would never be the case of moving an empty thread to an OQ.

Embodiments of the present invention provide hardware instruction break point capability in a multi-threaded processing environment. A dedicated instruction break point flag is added to each instruction word that allows the execution engine to halt execution of the running thread and return it to the scheduler. The scheduler then signals the execution engine to return all remaining running threads to the scheduler and enter an idle state. Through a debug interface, the instruction break point status of each thread in the scheduler can be queried and the thread state memories in the execution engine can be accessed for analysis.

A typical software instruction break point might replace a given instruction with a special debugging instruction. Upon execution of the break point instruction, the running thread is halted. The debug instruction is a part of the instruction set that the underlying execution engine decodes and executes similarly to any other instruction of the instruction set. Additionally, inter-thread communication might be required to bring the execution engine to an orderly idle state before debugging begins. Embodiments of the present invention provide a hardware instruction break point that adds a dedicated instruction break point flag to each instruction word of the instruction set. If the instruction break point is enabled and the instruction break point flag is set, the execution engine executes an implicit no op instruction and returns the running thread to the scheduler. The scheduler then signals the execution engine to return all remaining running threads and enter an idle state. Multiple running threads might reach the same or different instruction break points at the same time. Through a debug interface, the instruction break point status of each thread might be queried and the thread state memories in the execution engine might be read.

A dedicated instruction break point flag in the instruction word is used to indicate to execution engine MTIE 214 that a running thread is to be returned to SCH 204 to be parked due to the breakpoint. MTIE 214 might include a configuration register to enable the instruction break point flag. Upon receiving a thread including an instruction break point, SCH 204 signals MTIE 214 to return all remaining running threads to SCH 204 to be parked, thus putting MTIE 214 in an idle state.

As described herein, in a multi-threaded processing system such as network processor 100, each thread executes a flow of instructions based upon task assignment. Typically, an instruction set for such a multi-threaded processing system is small and each thread is allocated state memories such as instruction pointer, argument pointer, stack, global registers, and the like. As shown in FIG. 2, embodiments of the present invention provide that SCH 204 interfaces to execution engine MTIE 214.

Figure 13:
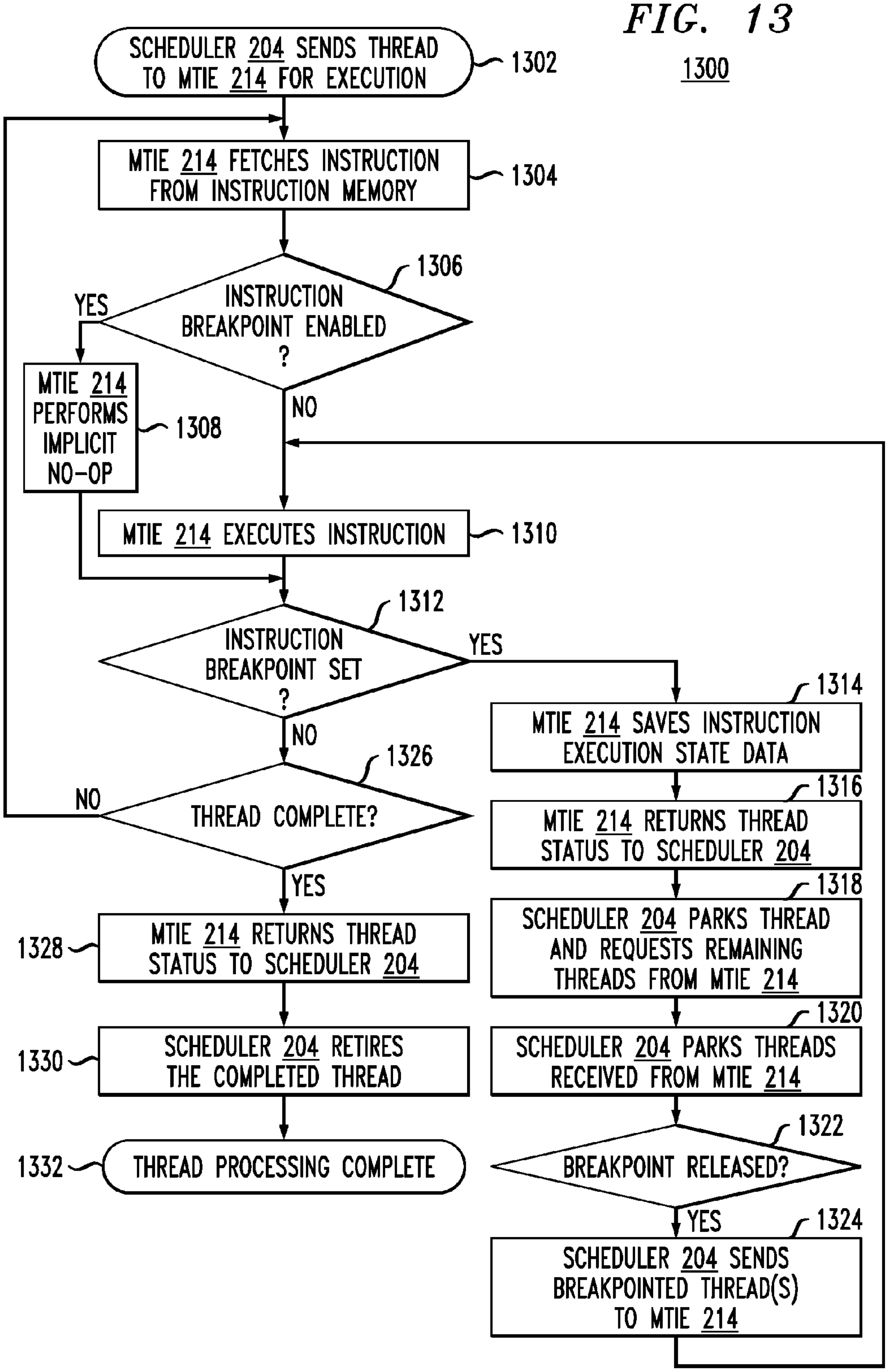
FIG. 13 shows a flow diagram of a breakpoint process in accordance with exemplary embodiments of the present invention.

FIG. 13 shows a flow diagram of instruction breakpoint operation 1300 of SCH 204 and MTIE 214. At step 1302, a thread is first started by SCH 204, and the thread's initial instruction pointer, flags, input parameters and instruction break point mask are sent from SCH 204 to MTIE 214. MTIE 214 stores the thread inputs received from SCH 204 into one or more thread state memories and at step 1304 retrieves the thread instructions from an instruction memory, for example flow memory 230. At step 1306, if instruction breakpoint mode is disabled, the instruction breakpoint flag in the instruction word is ignored and at step 1310, MTIE 214 executes the returned instruction word from instruction memory. At step 1306, if instruction breakpoint mode is enabled, MTIE 214 executes an implicit no-op instruction at step 1308 instead of the returned instruction word from the instruction memory. At step 1312, if the instruction breakpoint flag in the instruction word is set, at step 1314 MTIE 214 saves the thread state and at step 1316 returns the thread to SCH 204 with an indication that an instruction breakpoint was reached. At step 1318, upon receiving the returned thread from MTIE 214, SCH 204 parks the thread and signals MTIE 214 to return all remaining running threads. At step 1320, any threads returned by MTIE 214 are parked. Multiple running threads in the execution engine might hit the same or different instruction break points concurrently.

SCH 204 waits at step 1322 for the breakpoint to be released, for example, via a signal received from the debug interface. Through the debug interface, the thread instruction breakpoint status in SCH 204 might be accessed by devices external to network processor 100 via, for example, a Joint Test Action Group (JTAG) interface, a Serial Wire Debug (SWD) interface, a Serial Peripheral Interface (SPI) or a Universal Asynchronous Receiver/Transmitter (UART). Thread state memories in MTIE 214 might similarly be accessed for analysis. Once the breakpoint is released by, for example, a device external to network processor 100 via the debug interface, at step 1324 the parked threads are returned from SCH 204 to MTIE 214 to resume instruction execution. At step 1324, when SCH 204 returns parked threads to MTIE 214 to resume instruction execution, SCH 204 also returns an indication of which instruction(s) first reached the breakpoint. At step 1310, MTIE 214 then executes the instruction that first reached the breakpoint once it is returned from SCH 204 without requiring the corresponding breakpoint flag to be cleared first.

Processing of the thread might continue as described above until the thread is completed. At step 1326, if the thread is not complete, MTIE 214 might retrieve the next thread instruction at step 1304. If the thread is complete, at step 1328, MTIE 214 returns the thread status to SCH 204. At step 1330, SCH 204 retires the competed thread and thread processing of the corresponding thread is complete. When multiple threads are active, processing continues for each thread until each thread is completed.

SCH 204 might include one bit vector per each context. Via the debug interface, a breakpoint might be set on a particular address in the instruction memory (e.g., flow memory 230) of MTIE 214. When that particular address is accessed by MTIE 214 to read and process that instruction, MTIE 214 recognizes the breakpoint and returns the thread to SCH 204, just as if the thread had completed normally. SCH 204 then halts all threads in MTIE 204 by requesting MTIE 214 return any remaining threads to SCH 204. Thus, embodiments of the present invention provide a scheduler module to halt threads from one or more processor of an SoC.

Embodiments of the present invention provide that threads in a multithreaded system might be allocated (started) in any order and de-allocated (terminated) in any order, and that processes associated with the threads are handled in the order in which the threads were started. Embodiments of the present invention define a per-thread state structure, how the structure is managed when threads are allocated or de-allocated and how per-thread status information is used to find the oldest thread. This per-thread status structure allows for: i) tracking active threads in thread start order; ii) single cycle update of per-thread status on a thread de-allocate; and iii) single cycle lookup of the next oldest thread.

As described herein, network processor 100 might execute multiple threads in parallel with functions for the various threads issued without particular ordering. Synchronizing processing of these events or functions in the order the threads were started might be desirable. Specific events or functions that need to be ordered might be defined within submodules of network processor 100 such that only the threads associated with these functions are ordered. For example, functions destined for different modules might be defined to be ordered by FBI 216. A list of active threads might be maintained in the order the threads were started and this active thread list might be used for scheduling events or functions associated with the thread. Embodiments of the present invention allow for management of active threads in thread start order and updates the active thread list on a thread de-allocate event. Further, embodiments of the present invention provide simplified lookup of the oldest active thread.

Some design implementations typically use linked list structures maintained in memory for tracking active threads. Removal of an active thread from middle of the linked list due to a thread de-allocate event requires 2 clock cycles: one clock cycle to read the link from memory and a second clock cycle to write the value to different memory location. Since this operation takes two clock cycles, the operation requires additional complexity, such as FIFOs and hold logic, for processing back-to-back thread de-allocate events. Another approach implements event order lists or memory structures with a scalable number of read ports, meaning that each read port has dedicated RAM for optimal performance. The number of read ports is a function of how many independent events need to be synchronized, so, to prevent backup of threads in cases where oldest thread is not de-allocated for a long time, the ordered list size might be large.

Figure 14:
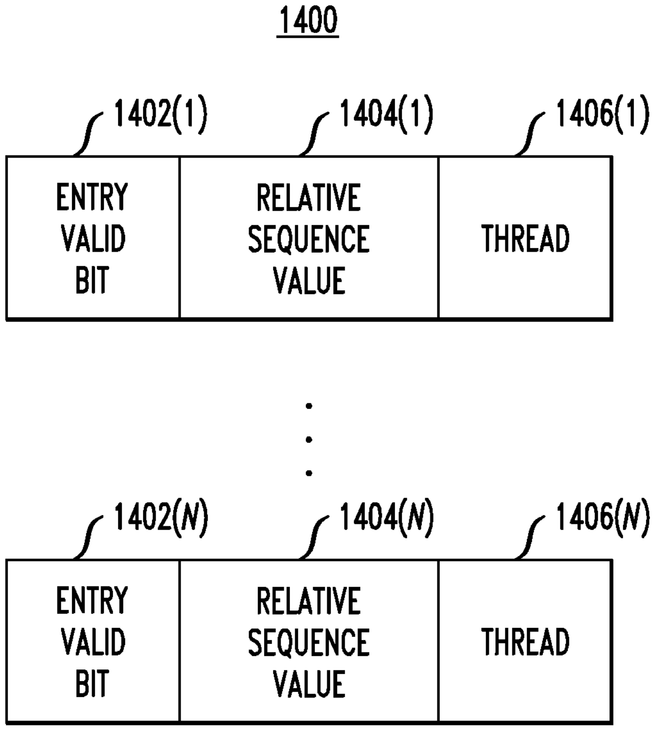
FIG. 14 shows a block diagram of a thread status data structure in accordance with embodiments of the present invention.

Embodiments of the present invention define i) a data structure for tracking currently active threads by thread start order, ii) allocate and de-allocate events to update the thread status information, and iii) a sequence value to identify next oldest thread in the list. As shown in FIG. 14, thread status data structure 1400 tracks up to N currently active threads. Thread status data structure 1400 includes valid field 1402(1)-1402(N) to indicate a valid active thread, sequence field 1404(1)-1404(N) to track the sequence number of each thread, and thus thread start order, and thread field 1406(1)-1406(N) to identify which thread corresponds to the respective entry of thread status data structure 1400.

MPP 200 might maintain a global sequence counter that is incremented each time a new thread is allocated. When a thread is allocated, thread status data structure 1400 is updated such that the sequence field (e.g., the corresponding one of 1404(1)-1404(N)) for the thread is updated with the sequence number. The valid bit (e.g., the corresponding one of 1402(1)-1402(N)) is set to 1. When the thread is de-allocated, the structure corresponding to the thread is updated. For any thread structure with a sequence value greater or equal to the sequence value of the de-allocated thread, the sequence value is decremented. The valid bit is cleared for the de-allocated thread. The global sequence counter is decremented.

Figure 15:
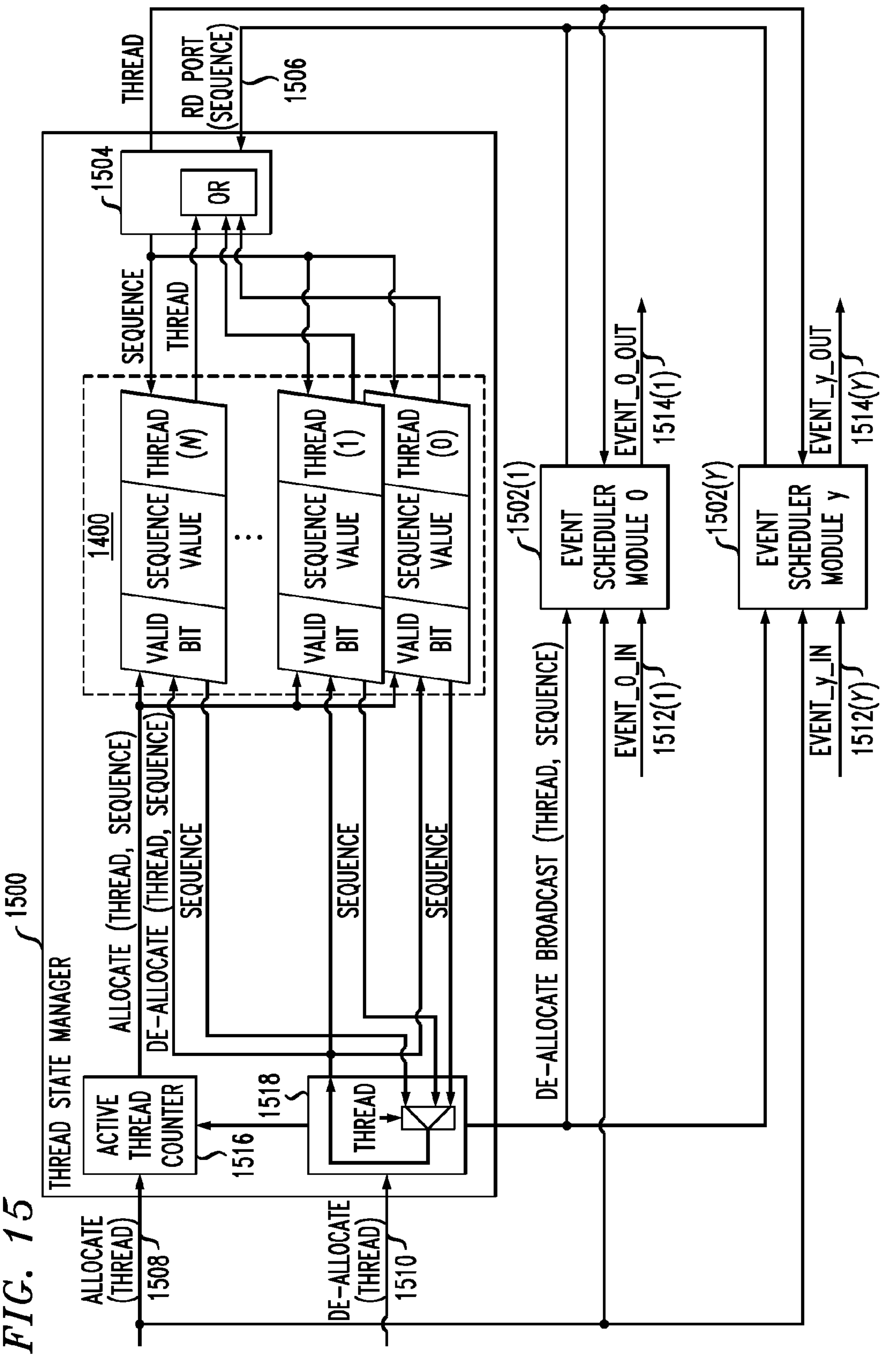
FIG. 15 shows a block diagram of a Thread Scheduling Manager (TSM) and one or more Event Scheduling Modules (ESMs) of the modular packet processor of FIG. 2.

When a thread is de-allocated, the sequence value and thread value associated with this thread is read from thread status data structure 1400. These values might be broadcast to modules of MPP 200, for example, as shown in FIG. 15, one or more Event Scheduling Modules (ESMs) 1502(1)-1502(Y), to update their local current active sequence value. Each ESM with sequence value greater than the broadcast sequence decrements its sequence value. In general, ESMs 1502(1)-1502(Y) might be any module of MPP 200 that schedules thread operations.

FIG. 15 shows a block diagram of Event Scheduler Modules (ESMs) 1502(1)-1502(Y) interfacing to thread status data structure 1400. Rd Port 1504 is provided for ESMs 1502(1)-1502(Y) to read thread status data structure 1400 to retrieve thread status data associated with the given sequence. Thread status data structure 1400 is maintained by thread state manager (TSM) 1500.

Thread status data structure 1400 might be updated by TSM 1500 through comparison logic (not shown) to determine if the incoming sequence matches the sequence associated with this thread. Structures with no matches output a value of 0 for the thread. The sequence values for each valid thread are mutually exclusive; therefore, for any sequence, at most there is generally only one match. All the output thread values are logic ORed together by OR gate 1506 to generate a thread value. Rd port 1504 is used by ESMs 1502(1)-1502(Y) to find the oldest thread in thread status data structure 1400. As described, the oldest thread is assigned sequence value of 0, until this thread is de-allocated, at which point each active thread has its corresponding sequence value decremented, where the thread with resulting sequence value of 0 is the oldest thread. As shown in FIG. 15, functions might be issued to an ESM in any order for a given thread. ESMs 1502(1)-1502(Y) then read thread status data structure 1400 to reorder the functions for issue in the thread start order.

As shown in FIG. 15, ESMs 1502(1)-1502(Y) employ allocate interface 1508 and de-allocate interface 1510 for maintaining their local sequence value and local thread status. The ESM thread status captures information such as threads having events waiting to be scheduled and threads that already have been scheduled. ESMs 1502(1)-1502(Y) use the thread value associated with incoming event to track threads waiting to be scheduled. Initially, each ESM 1502(1)-1502(Y) has a sequence value of 0 and if the thread associated with this sequence has a valid event, the event is scheduled. If there are more threads waiting to be scheduled for a given ESM, the sequence value is incremented by active thread counter 1516 and thread value associated with this sequence is requested from thread status data structure 1400. This process continues until all events have been scheduled, the thread associated with the sequence is not the oldest thread, or if the ESM has not yet received an event for the thread value associated with this sequence. ESMs 1502(1)-1502(Y) decrement their sequence values by thread decrementer 1518 when the sequence value on de-allocate interface 1510 is less than the current sequence value. ESMs 1502(1)-1502(Y) might look up the next oldest thread before the current oldest thread is de-allocated.

With more than one active thread in the system, each ESM might lookup the next oldest thread information by advancing the local sequence value and using it to request thread value via Rd Port 1506. Each ESM updates its local sequence value appropriately when a thread de-allocate request is provided on de-allocate interface 1510. ESMs 1502(1)-1502(Y) use the sequence value to adjust their local sequence values accordingly. ESMs with a local sequence value greater than or equal to the de-allocate sequence value decrement their local sequence values.

Figure 16:
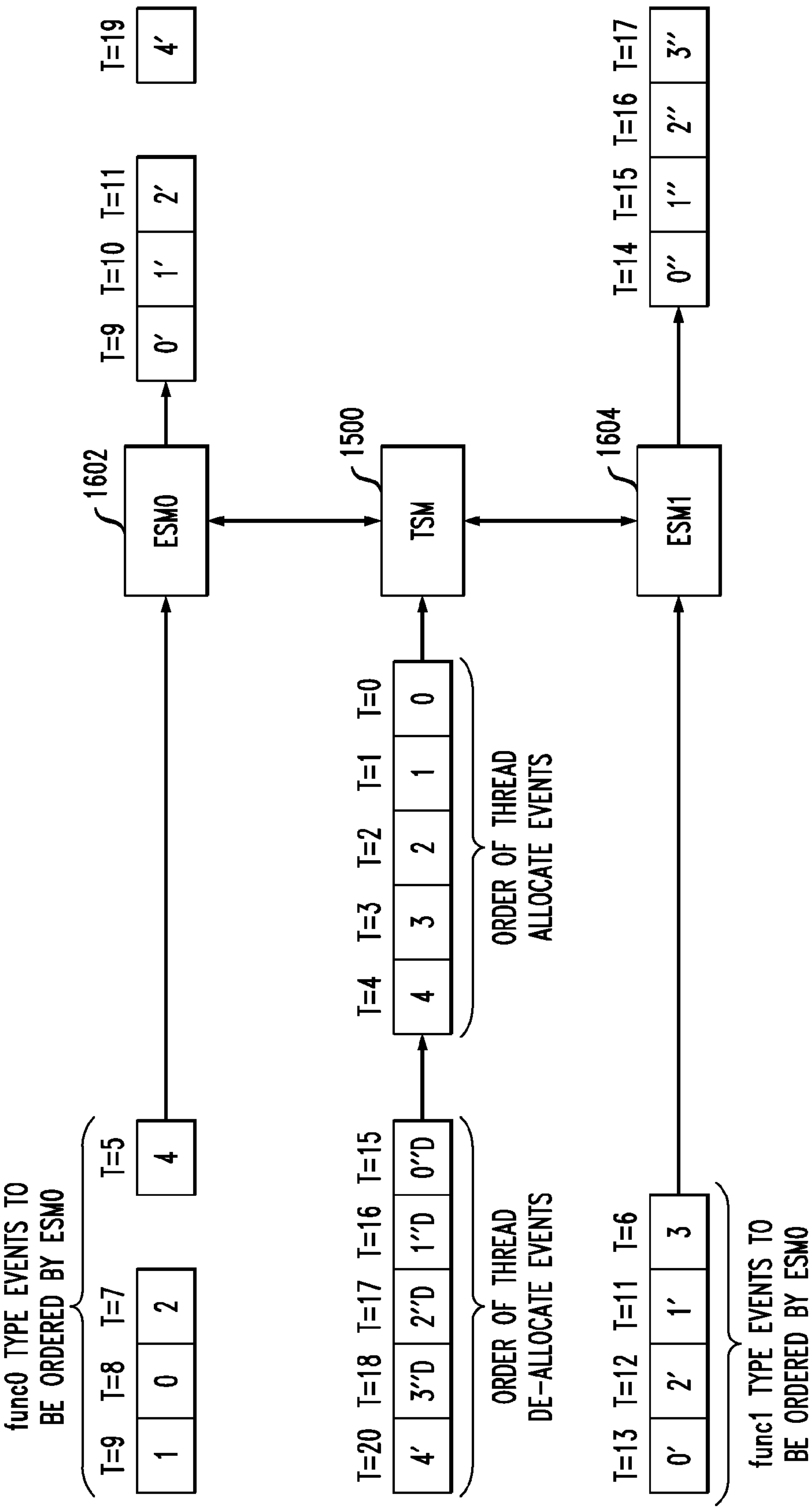
FIG. 16 shows a block diagram of an exemplary system timing for a system employing one or more ESMs of FIG. 15.

FIG. 16 shows a block diagram of an exemplary system timing where ESM0 1602 and ESM1 1604 are ordering events having exemplary types func0 and func1. In the exemplary system there are 5 threads (0, 1, 2, 3, 4) started in incrementing order. As shown in FIG. 16, TSM 1500 receives the order of thread allocation, in incrementing thread order. As shown, at time T=0, thread 0 is allocated; at time T=1, thread 1 is allocated; at time T=2, thread 2 is allocated; at time T=3, thread 3 is allocated; and at time T=4, thread 4 is allocated. Threads 4, 2, 0 and 1 are requested to order func0 type events and are listed in the order that they are received by ESM0 1602. As shown, ESM0 1602 receives a func0 event request from thread 4 at time T=5, a func0 event request from thread 2 at time T=7, a func0 event request from thread 0 at time T=8, and a func0 event request from thread 1 at time T=9.

As shown, ESM1 1604 receives a fund event request from thread 3 at time T=6. Threads scheduled by ESM0 1602 are shown as threads 0', 1', 2' and 4'. ESM0 1602 schedules func0 events on threads 0, 1 and 2 however, ESM0 1602 cannot schedule a func0 event for thread 4 until thread 3 is de-allocated, or thread 3 requests a func0 event, such that thread 4 becomes the oldest unscheduled thread for ESM0 1602. Threads scheduled by ESM0 1602 might be employed to request func1 events. As shown in the example of FIG. 16, ESM1 1604 receives a func1 event request from thread 1' at time T=11, a func1 event request from thread 1' at time T=11, and a func1 event request from thread 1' at time T=11. Threads scheduled by ESM1 1604 are shown as threads 0", 1", 2" and 3". ESM1 1604 processes these requests and schedules the fund events in the thread start order, shown as threads 0" (at time T=14), 1" (at time T=15), 2" (at time T=16) and 3" (at time T=17). In this example, once ESM1 1604 schedules threads 0", 1", 2" and 3", the threads are complete and can be de-allocated. Thus, as shown, de-allocate events are received by TSM 1500, for example, for thread 0" at time T=15, for thread 1" at time T=16, for thread 2" at time T=17, for thread 3" at time T=18, and for thread 4' at time T=20. TSM 1500 broadcasts the de-allocation of thread 3" at time T=18 allowing ESM0 1602 to schedule thread 4 at time T=19. Thus, ESM0 and ESM1 have scheduled the func0 and func1 events respectively in thread start order.

As described with regard to FIG. 15, function requests might arrive to one of ESMs 1502(1)-1502(Y) in any order associated with a thread, for example by event_in signal 1512(1), but the ESMs reorder the function requests to be issued in the thread start order, for example by event out signal 1514(1).

As described herein, State Engine (SENG) 218 of MPP 200 shown in FIG. 2 might perform functions of a finite state machine (FSM) that operates on received packets. For example, SENG 218 might perform statistics counts and run traffic shaper scripts. SENG 218 might employ a data cache to reduce access latency to memory, for example system memory 112 and external memory 116.

Figure 17:
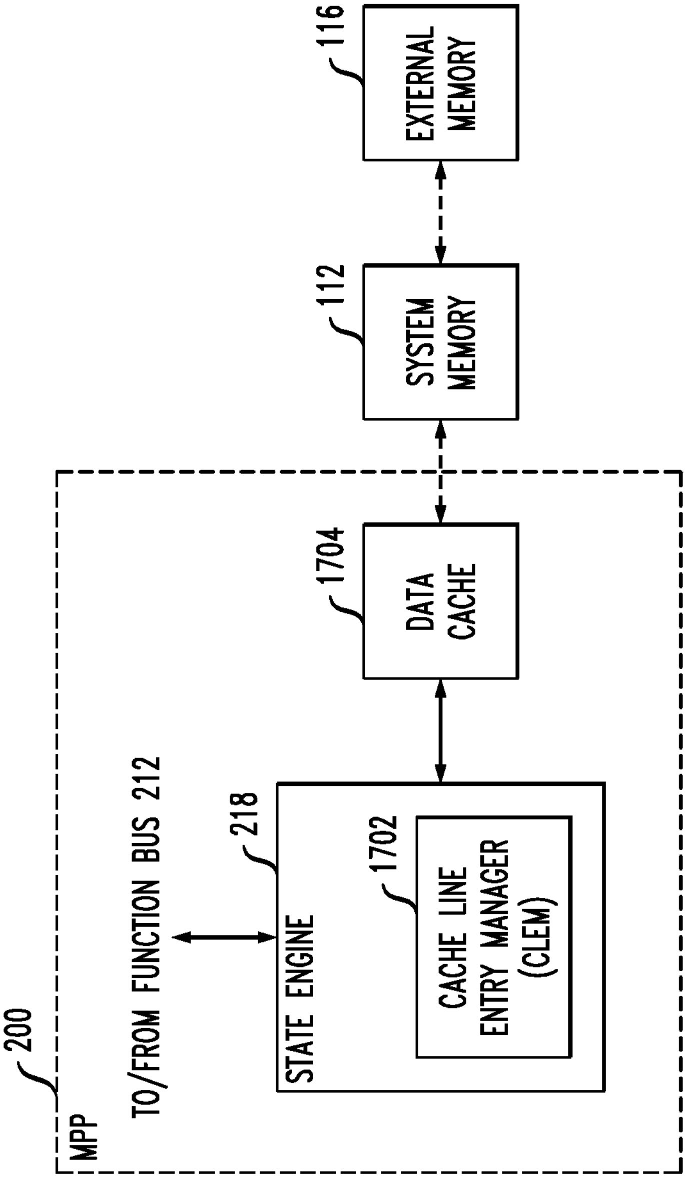
FIG. 17 shows a block diagram of a state engine of the modular packet processor of FIG. 2.

FIG. 17 shows additional detail of SENG 218. As shown in FIG. 17, SENG 218 might include Cache Line Entry Manager (CLEM) 1702 and be coupled to local data cache 1704. Data cache 1704 might be implemented as an L1 cache. As shown in FIG. 17 by the dashed lines, data cache 1704 might interface with external memory 116 via system memory 112. CLEM 1702 might be employed to manage coherency of data within data cache 1704. Data cache 1704 might be employed to support pre-fetching of data for one or more active threads of MPP 200.

Figure 18:
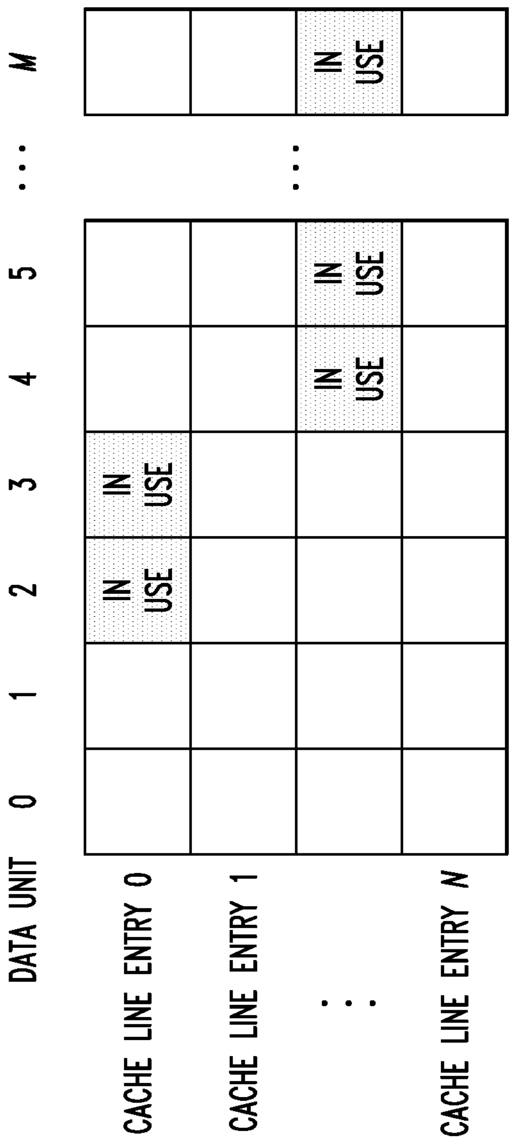
FIG. 18 shows a block diagram of an exemplary cache structure employed by the state engine of FIG. 17.

As shown in FIG. 18, data cache 1704 might include up to N cache line entries. Each cache line entry in data cache 1704 is assigned an ID value, for example, 0-N, where N is a positive integer. As shown, each cache line entry in data cache 1704 might include one or more data units, for example, 0-M, where M is a positive integer. In some embodiments, each cache line might have a length greater than an amount of data requested by a given thread (e.g., M is greater than a requested number of data units). As shown in the exemplary case of FIG. 18, cache line entry 0 and cache line entry 2 might include one or more data units currently being accessed by one or more threads, but the entire cache data line is not in use. Embodiments of CLEM 1702 might reduce head-of-line blocking where multiple threads request access to non-overlapping portions of the same cache line entry. For each incoming request for a thread to access data cache 1704, CLEM 1702 might determine whether the data is in use, or is available for access by the requesting thread.

CLEM 1702 is employed to manage data within a cache line entry of data cache 1704. Each time SENG 218 receives a cache access request from a thread of MPP 200, SENG 218 might determine a cache line entry ID of data cache 1704 corresponding to the request. The cache line entry is employed by CLEM 1702 to manage data coherency of data within cache lines of data cache 1704. For example, a cache access request might typically result from thread instructions executed by MTIE 214. A given thread might request data from data cache 1704 by sending an index to SENG 218. SENG 218 might translate the incoming index or indices into a physical address of the requested data in data cache 1704. SENG 218 might also determine a number of data units of the cache line entry ID that are requested (the "operand data size"), and an offset into the cache line entry where the data is stored (the "operand data offset"). Once the entry is allocated in data cache 1704, the entry ID and the incoming request operand data offset and operand data size are provided to CLEM 1702. CLEM 1702 is initialized to track a predetermined number of cache access requests, each request represented by a token. In some embodiments, the number of tokens supported by CLEM 1702 might be a function of the processing pipeline depth of the requesting module of MPP 200 and the latency between SENG 218 receiving a cache access request and SENG 218 writing data back to data cache 1704 ("data write back latency").

Figure 19:
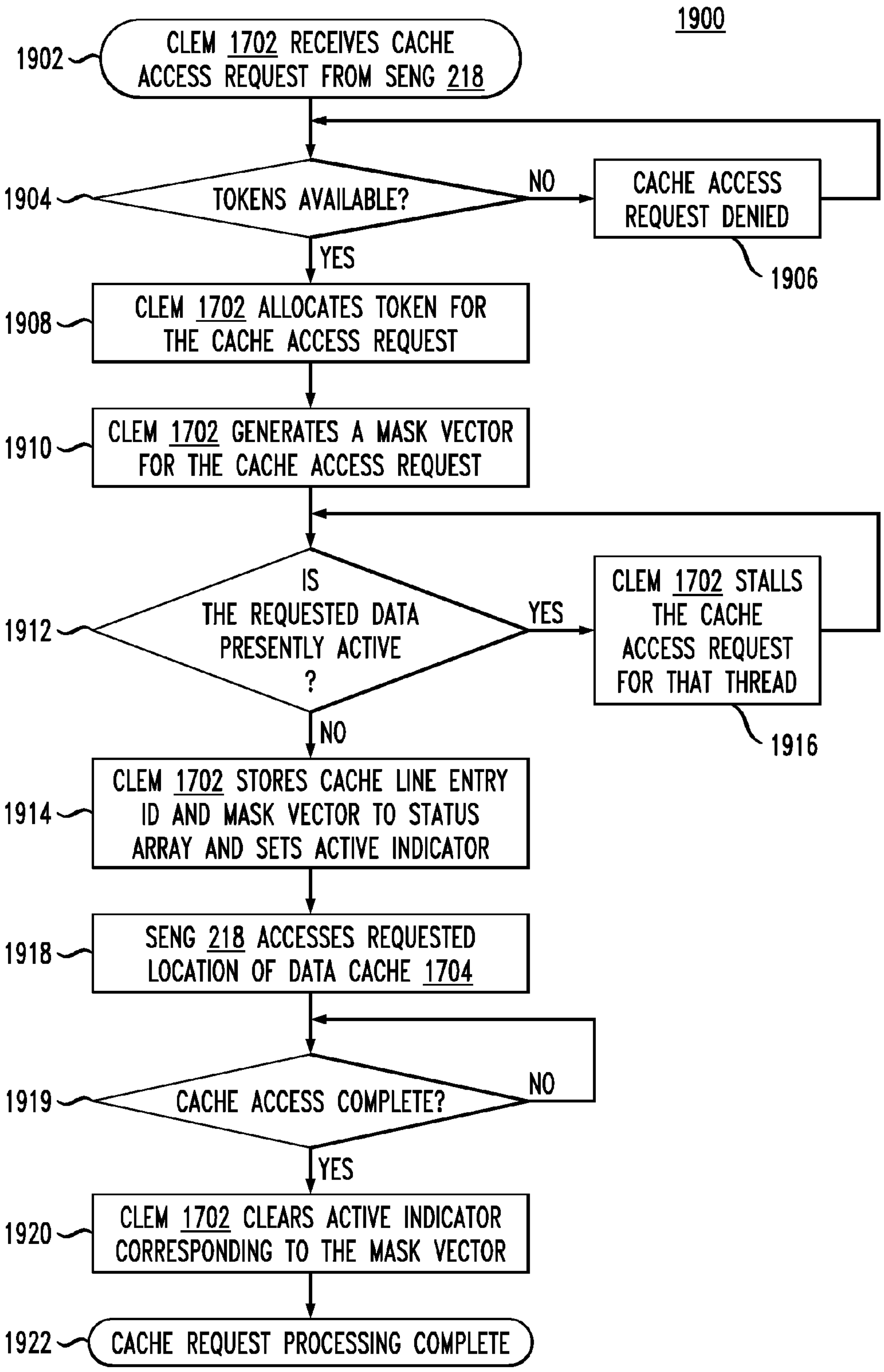
FIG. 19 shows a flow diagram of a token allocation operation employed by the state engine of FIG. 17.

FIG. 19 shows a flow diagram of token allocation process 1900 employed by CLEM 1702. The exemplary process 1900 is shown for a single cache access request. As described herein, multiple cache access requests might be concurrently active or pending in CLEM 1702. At step 1902, a cache access request is received by CLEM 1702. If, at step 1904, no tokens are available, or a number of available tokens is below a minimum threshold, the cache access request is denied at step 1906, until a token becomes available at step 1904. At step 1904, if one or more tokens are available, the incoming cache access request is assigned a token at step 1908. At step 1910, CLEM 1702 generates a mask vector based on the requested cache line entry ID, operand data size and operand data offset. The mask vector corresponds to the requested data units in the requested cache line entry.

The assigned token might be employed as an index into a status array of CLEM 1702. The status array will be described in greater detail in regard to Table 10. At step 1912, CLEM 1702 checks the status array to determine whether the requested data is currently active. For example, CLEM 1702 checks each entry in the data status array to determine if one or more mask vectors are active for the requested cache line entry ID, and whether the generated mask value overlaps with any mask values currently active for the cache line entry ID. If, at step 1912, the requested data is not presently active, at step 1914, the incoming cache line entry ID and the generated mask are stored in the status array entry indexed by the token, and an active indicator in the status array corresponding to the mask vector is set. At step 1918, SENG 218 processes the cache access request. As described herein, multiple cache access requests for a single cache line entry ID might be processed concurrently if the data access requests do not access overlapping data units.

If, at step 1912, the requested data is presently active, at step 1916, the cache access request might be stalled for the particular thread until the requested data becomes inactive, for example, when the active indicator is cleared. CLEM 1702 might continue to process cache access requests for other threads substantially similarly as shown by process 1900.

At step 1920, as cache accesses are completed, CLEM 1702 might clear the active indicator in the status array corresponding to the mask vector of the completed cache access. A cache access might be complete, for example, when data corresponding to the access request is written to data cache 1704. At step 1922, processing for a given cache access is complete.

Table 10 shows exemplary entries of the status array of CLEM 1702:

TABLE 10

Exemplary Status Array

| Token | Active Indicator | Cache Line Entry ID | Mask Vector |
|---|---|---|---|
| 0 | set | 0 | 00110000 |
| 1 | cleared | X | X |
| 2 | set | 2 | 00001111 |
| 3 | cleared | X | X |

For the example shown in Table 10, data cache 1704 might include 4 cache lines, where each cache line has 8 data units, each having a corresponding offset. As shown in Table 10, cache line entry 0 data units at offset 2 and 3 and cache line entry 2 data units with offsets 4, 5, 6 and 7 are active at a given time. In this example, consecutive requests for access to data cache 1704 with cache line entry 0, operand data offset 2 and operand size 1 or 2, will be blocked since the data is currently in use. Similarly, consecutive requests for access to data cache 1704 with cache line entry 2, operand data offset 0 and operand data size of 1, 2, 3 or 4 will be granted access.

Thus, as described herein, embodiments of the present invention provide a packet classifier of a network processor having a plurality of processing modules. A scheduler generates a thread of contexts for each tasks generated by the network processor corresponding to each received packet. The thread corresponds to an order of instructions applied to the corresponding packet. A multi-thread instruction engine processes the threads of instructions. A state engine operates on instructions received from the multi-thread instruction engine, the instruction including a cache access request to a local cache of the state engine. A cache line entry manager of the state engine translates between a logical index value of data corresponding to the cache access request and a physical address of data stored in the local cache. The cache line entry manager manages data coherency of data in the local cache and allows one or more concurrent cache access requests to a given cache data line for non-overlapping data units.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

I claim:

1. A packet classifier for a network processor having a plurality of processing modules and at least one shared memory coupled to an external memory, wherein the network processor generates one or more tasks corresponding to each of a plurality of received packets, the packet classifier comprising:

a scheduler configured to generate one or more contexts corresponding to tasks received by the packet classifier from one of the plurality of processing modules;

a multi-thread instruction engine configured to process one or more threads of instructions, each thread of instructions corresponding to a context received from the scheduler;

a state engine configured to operate a finite state machine (FSM) on instructions received from the multi-thread instruction engine, wherein a received instruction includes a cache access request to a local data cache coupled to the state engine, wherein the state engine comprises:

a cache line entry manager configured to (i) translate between a logical index value of the cache access request and a physical address of the local data cache, and (ii) manage data coherency of the data stored in the local data cache, wherein the local data cache comprises N data lines, each data line comprising M data units, where N and M are positive integers, wherein the cache line entry manager allows one or more concurrent cache access requests to a given cache data line for non-overlapping data units.

2. The packet classifier of claim 1, wherein the state engine is further configured to perform statistics counts and traffic shaping of the network processor.

3. The apparatus of claim 1, wherein the network processor is implemented in an integrated circuit.

4. The packet classifier of claim 1, wherein the local data cache is a level 1 (L1) cache.

5. The packet classifier of claim 4, wherein the local data cache is in communication with the at least one shared memory and the external memory, wherein the at least one shared memory is configured to store a first subset of data stored in the external memory, and the local data cache is configured to store a second subset of the first subset of data stored in the at least one shared memory, the second subset of data accessed more recently than the first subset of data.

6. The packet classifier of claim 1, wherein the cache line entry manager is configured to:

allocate a token to each received cache access request;

generate a mask vector corresponding to each received cache access request, the mask vector comprising an entry for each data unit of a given cache line corresponding to the received cache request;

maintain a status array corresponding to each cache line and to each data unit, wherein the status array includes (i) one or more mask vectors and (ii) one or more active indicators, the one or more mask vectors corresponding to each cache line, and the one or more active indicators corresponding to each mask vector, wherein the token of the received access request is an index to the status array.

7. The packet classifier of claim 6, wherein the cache line entry manager is configured to associate the token value with a requested logical address, an operation size and an operation offset of the corresponding cache access request.

8. The packet classifier of claim 6, wherein the cache line entry manager is configured to (i) set the active indicator of the mask vector when the cache access request corresponding to the cache access request is active, and (ii) clear the active indicator of the mask vector when the cache access request corresponding to the cache access request completes.

9. The packet classifier of claim 8, wherein the cache line entry manager is configured to (i) determine whether one or more mask vectors have the corresponding active indicator set for a given cache line and (ii) if the one or more mask vectors have the corresponding active indicator set for a given cache line, determine whether an overlap exists between the one or more active mask vectors and the mask vector of the cache access request.

10. The packet classifier of claim 9, wherein:

if one or more mask vectors have the corresponding active indicator set for the requested cache line and there is no overlap between the one or more active mask vectors and the mask vector of the cache access request, the cache line entry manager is further configured to process the cache access request.

11. The packet classifier of claim 9, wherein:

if no mask vectors have the corresponding active indicator set for the requested cache line, the cache line entry manager processes the cache access request.

* * * * *